United States Patent
Kakura

(10) Patent No.: US 8,027,400 B2
(45) Date of Patent: Sep. 27, 2011

(54) WIRELESS COMMUNICATION SYSTEM, WIRELESS COMMUNICATION APPARATUS, AND RESOURCE ASSIGNMENT METHOD USED THEREIN

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1386 days.

(21) Appl. No.: 10/584,738

(22) PCT Filed: Dec. 24, 2004

(86) PCT No.: PCT/JP2004/019754
§ 371 (c)(1),
(2), (4) Date: Jun. 26, 2006

(87) PCT Pub. No.: WO2005/062510
PCT Pub. Date: Jul. 7, 2005

(65) Prior Publication Data
US 2007/0160160 A1    Jul. 12, 2007

(30) Foreign Application Priority Data
Dec. 24, 2003    (JP) .................................. 2003-426045

(51) Int. Cl.
*H04L 1/02*    (2006.01)
(52) U.S. Cl. ........ 375/267; 375/260; 375/299; 375/347; 455/101; 455/132; 455/296; 455/500; 370/334
(58) Field of Classification Search .................. 375/267, 375/347, 299; 370/334; 455/101, 132, 500, 455/296
See application file for complete search history.

(56) References Cited

U.S. PATENT DOCUMENTS

| | | | |
|---|---|---|---|
| 5,548,582 A | 8/1996 | Brajal et al. | |
| 6,563,881 B1 | 5/2003 | Sakoda | |
| 6,611,676 B2 * | 8/2003 | Ue et al. .......................... | 455/69 |
| 6,726,297 B1 | 4/2004 | Uesugi | |
| 6,728,293 B1 * | 4/2004 | Partyka ......................... | 375/131 |
| 6,760,596 B1 * | 7/2004 | Fiorini et al. ................. | 455/522 |
| 7,031,402 B2 * | 4/2006 | Takada .......................... | 375/296 |
| 2003/0081563 A1 * | 5/2003 | Hottinen et al. ............. | 370/320 |
| 2006/0215603 A1 * | 9/2006 | Nishio et al. .................. | 370/329 |

FOREIGN PATENT DOCUMENTS

JP    11-346203    12/1999

(Continued)

OTHER PUBLICATIONS

Takuya Kadoya et al., "Studies on MMFSK System, Construction of hopping pattern, Parallel MMFSK System" Technical Report of IEICE, SST, Spread Spectrum, Japan, The Institute of Electronics, Information and Communications Engineers; Oct. 13, 2000; vol. 100, No. 362, pp. 25-30.

(Continued)

*Primary Examiner* — Leon Flores
(74) *Attorney, Agent, or Firm* — Scully, Scott, Murphy & Presser P.C.

(57) ABSTRACT

In a transmitting portion of a wireless communication apparatus, hopping pattern generating portions 16 and 17 produce hopping patterns independent from each other and specific to a transmitter. Subcarrier assigning portions 18 and 19 assign transmission symbol sequences to subcarriers 1 to R in accordance with the hopping patterns and produce frequency hopping signals. In a receiving portion of the wireless communication apparatus, a MIMO demodulating portion 37 combines and decomposes a FFT signal and produces a demodulated signal. Hopping pattern generating portions 38 and 39 produce unique hopping patterns corresponding to transmitters 1-1 to 1-K, respectively. Subcarrier extracting portions 40 and 41 extract, from the demodulated signal, components corresponding to the hopping patterns and produce the components as partial demodulated sequences, respectively.

21 Claims, 18 Drawing Sheets

FOREIGN PATENT DOCUMENTS

| | | |
|---|---|---|
| JP | 2000-92009 | 3/2000 |
| JP | 2002-191073 | 7/2002 |
| JP | 2003-32226 | 1/2003 |
| JP | 2003-249882 | 9/2003 |
| JP | 2003-249914 | 9/2003 |
| WO | WO 02/061969 A1 | 8/2002 |
| WO | WO 02/093779 A2 | 11/2002 |

OTHER PUBLICATIONS

Japanese Office Action dated Oct. 27, 2010 with partial English translation.

Japanese Office Action dated Aug. 4, 2010 with English translation.

Japanese Office Action dated Feb. 9, 2011 with English translation.

Van Nee, Richard, et al. "Maximum Likelihood Decoding in a Space Division Multiplexing System," IEEE VTC 2000 Spring Proceedings, May 2000, pp. 6-10.

Ohkawa, Mitsugu, et al. "Improvement of Characteristics for Orthogonal Multicarrier FH-CDMA schemes used Error Correction," The Institute of Electronics, Information and Communication Engineers, vol. 94, No. 546, Fig. 2, Mar. 16, 1995.

* cited by examiner

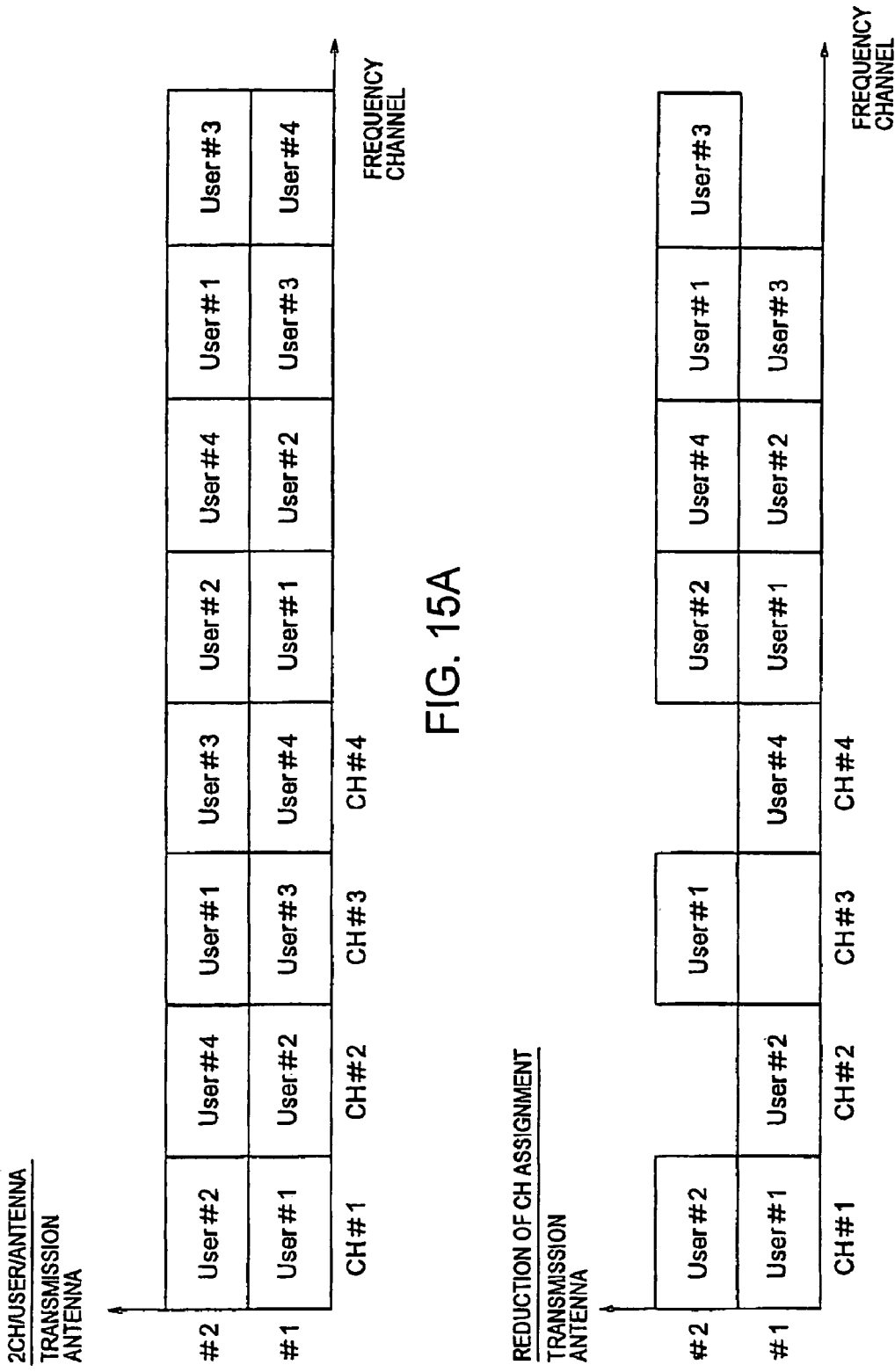

WIRELESS COMMUNICATION SYSTEM, WIRELESS COMMUNICATION APPARATUS, AND RESOURCE ASSIGNMENT METHOD USED THEREIN

TECHNICAL FIELD

This invention relates to a wireless communication system, a wireless communication apparatus, and a resource assignment method used therein and, in particular, to a method of assigning frequency channels for transmission sequences in a wireless communication system using a plurality of transmission and reception antennas.

BACKGROUND ART

As one of wireless transmission methods excellent in multipath resistance characteristic, an OFDM (Orthogonal Frequency Division Multiplexing) method is known in which intersymbol interference caused by multipath is removed by dividing a total bandwidth into a plurality of subcarriers, inserting guard intervals, and removing the guard intervals on a receiving side.

As one of techniques for frequency-multiplexing a plurality of users in the OFDM method, there is known a method of using a different frequency hopping pattern for each user (for example, see U.S. Pat. No. 5,548,582).

Hereinafter, referring to FIGS. 1 and 2, description will be made of a communication system using frequency hopping.

In a transmitter 6-1, an encoder 61 encodes a transmission sequence $S_{TS1}$ and produces a coded sequence $S_{CS}$. An interleaver 62 interleaves the coded sequence $S_{CS}$ and produces an interleaved sequence $S_{IS}$. A symbol mapping portion 63 maps the interleaved sequence $S_{IS}$ into modulated symbols and produces a transmission symbol sequence $S_{TSY}$.

A hopping pattern generating portion 64 produces a hopping pattern $S_{HP1}$ unique to the transmitter. According to the hopping pattern $S_{HP1}$, a subcarrier assigning portion 65 assigns the transmission symbol sequence $S_{TSY}$ to subcarriers 1 to R and produces frequency hopping signals $S_{FH1}$ to $S_{FHR}$. A high-speed inverse Fourier transformer 66 carries out high-speed inverse Fourier transform upon the frequency hopping signals $S_{FH1}$ to $S_{FHR}$ and produces an IFFT signal $S_{IFFT}$. A guard interval adding portion 67 adds guard intervals to the IFFT signal $S_{IFFT}$ and delivers a transmission signal $S_{TSX1}$ via an antenna 68. Transmitters 6-2 to 6-K are operated in the manner similar to the above-mentioned transmitter 6-1 and, in response to transmission sequences $S_{TS2}$ to $S_{TSK}$, produce transmission signals $S_{TSX2}$ to $S_{TSXK}$, respectively.

In a receiver 7, a guard interval removing portion 72 removes the guard intervals from a reception signal $S_{RX}$ supplied to an antenna 71 and produces a FFT input signal $S_{FFTI}$. A high-speed Fourier transformer 73 performs high-speed Fourier transform upon the FFT input signal $S_{FFTI}$ and produces FFT signals $S_{FFT1}$ to $S_{FFTR}$.

A hopping pattern generating portion 74 produces unique hopping patterns $S_{HP1}$ to $S_{HPK}$ corresponding to the transmitters 6-1 to 6-K, respectively. A subcarrier extracting portion 75 extracts, from the FFT signals $S_{FFT1}$ to $S_{FFTR}$, components corresponding to the hopping patterns $S_{HP1}$ to $S_{PHK}$, respectively, and outputs the components as demodulated sequences $S_{DMS1}$ to $S_{DMSK}$.

Deinterleavers 76-1 to 76-K deinterleave the demodulated sequences $S_{DMS1}$ to $S_{DMSK}$ and produce deinterleaved sequences $S_{DIS1}$ to $S_{DISK}$, respectively. Decoders 77-1 to 77-K decode the deinterleaved sequences $S_{DIS1}$ to $S_{DISK}$ and produce decoded sequences $S_{DCS1}$ to $S_{DCSK}$, respectively.

For example, transmission sequences correspond to different users, respectively. It is assumed that the transmission sequences are equal in number to four and frequency channels are equal in number to four. In this case, when users #1 to #4 carry out frequency hopping by the use of hopping patterns (#1, #3, #2, #4), (#2, #1, #4, #3), (#3, #4, #1, #2), (#4, #2, #3, #1), respectively, all of the users are orthogonal on a frequency axis at a same time instant, as illustrated in FIG. 3. All of the frequency channels are completely used by the respective users so that a frequency diversity effect is achieved.

On the other hand, MIMO (Multiple-Input Multiple-Output) using a plurality of antennas for transmission and reception is known as a method capable of improving a frequency usability by parallel transmission utilizing independency of propagation paths (for example, see Non-Patent Document: "Maximum Likelihood Decoding in a Space Division Multiplexing System" in IEEE VTC 2000 Spring Proceedings (R. van Nee et al, May 2000, pages 6 to 10).

Referring to FIGS. 4 and 5, description will be made about a communication system based on OFDM with frequency hopping applied thereto, in case where MIMO using two transmission antennas and two reception antennas is further applied.

In a transmitter 8-1, an encoder 81 encodes a transmission sequence $S_{TS1}$ and produces a coded sequence $S_{CS}$. An interleaver 82 interleaves the coded sequence $S_{CS}$ and produces an interleaved sequence $S_{IS}$. A serial/parallel converter 83 performs serial/parallel conversion upon the interleaved sequence $S_{IS}$ and produces serial/parallel signals $S_{SP1}$ and $S_{SP2}$.

Symbol mapping portions 84 and 85 map the serial/parallel signals $S_{SP1}$ and $S_{SP2}$ into modulated symbols and produce transmission symbol sequences $S_{TSY1}$ and $S_{TSY2}$, respectively. A hopping pattern generating portion 84 produces a hopping pattern $S_{HP1}$ unique to the transmitter. According to the hopping pattern $S_{HP1}$, subcarrier assigning portions 87 and 88 assign the transmission symbol sequences $S_{TSY1}$ and $S_{TSY2}$ to subcarriers 1 to R and produce frequency hopping signals $S_{FH11}$ to $S_{FH1R}$ and $S_{FH21}$ to $S_{FH2R}$, respectively.

High-speed inverse Fourier transformers 89 and 90 carry out high-speed inverse Fourier transform upon the frequency hopping signals $S_{FH11}$ to $S_{FH1R}$ and $S_{FH21}$ to $S_{FH2R}$ and produce IFFT signals $S_{IFFT1}$ and $S_{IFFT2}$, respectively. Guard interval adding portions 91 and 92 add guard intervals to the IFFT signals $S_{IFFT1}$ and $S_{IFFT2}$ and produce transmission signals $S_{TSX11}$ and $S_{TSX12}$. Transmitters 8-2 to 8-K are operated in the manner similar to the above-mentioned transmitter 8-1 and, in response to transmission sequences $S_{TS2}$ to $S_{TSK}$, produce transmission signals $S_{TSX21}$, $S_{TSX22}$, ..., $S_{TSXK1}$, $S_{TSXK2}$, respectively.

In a receiver 10, guard interval removing portions 103 and 104 remove the guard intervals from reception signals $S_{RX1}$ and $S_{RX2}$ supplied to antennas 101 and 102 and produce FFT input signals $S_{FFTI1}$ and $S_{FFTI2}$, respectively. High-speed Fourier transformers 105 and 106 perform high-speed Fourier transform upon the FFT input signals $S_{FFTI1}$ and $S_{FFTI2}$ and produce FFT signals $S_{FFT11}$ to $S_{FFT1R}$ and $S_{FFT21}$ to $S_{FFT2R}$, respectively.

A hopping pattern generating portion 107 produces unique hopping patterns $S_{HP1}$ to $S_{HPK}$ corresponding to the transmitters 8-1 to 8-K, respectively. Subcarrier extracting portions 108 and 109 extract, from the FFT signals $S_{FFT11}$ to $S_{FFT1R}$ and $S_{FFT21}$ to $S_{FFT2R}$, components corresponding to the hopping patterns $S_{HP1}$ to $S_{PHK}$, respectively, and output the components as extracted sequences $S_{EXT11}$ to $S_{EXT1R}$ and $S_{EXT21}$ to $S_{EXT2R}$.

A MIMO demodulating portion 110 combines and decomposes the extracted sequences $S_{EXT11}$ to $S_{EXT1R}$ and $S_{EXT21}$ to $S_{EXT2R}$ and produces partial demodulated sequences $S_{PDM11}$, $S_{PDM12}$, $S_{PDM21}$, $S_{PDM22}$, ..., $S_{PDMK1}$, $S_{PDMK2}$.

Parallel/serial converters 111-1 to 111-K carry out parallel/serial conversion upon the partial demodulated sequences $S_{PDM11}$, $S_{PDM12}$, $S_{PDM21}$, $S_{PDM22}$, ..., $S_{PDMK1}$, $S_{PDMK2}$ and produce demodulated sequences $S_{DMS1}$ to $S_{DMSK}$.

Deinterleavers 112-1 to 112-K deinterleave the demodulated sequences $S_{DMS1}$ to $S_{DMSK}$ and produce deinterleaved sequences $S_{DIS1}$ to $S_{DISK}$, respectively. Decoders 113-1 to 113-K decode the deinterleaved sequences $S_{DIS1}$ to $S_{DISK}$ and produce decoded sequences $S_{DCS1}$ to $S_{DCSK}$, respectively.

However, in the above-mentioned methods of applying frequency hopping and MIMO to the conventional OFDM, a distance between the transmission antennas can not sufficiently be large. If correlation between propagation paths is large, a diversity effect is small. In addition, signal separation at the MIMO demodulating portion is difficult, resulting in serious degradation in reception characteristics.

DISCLOSURE OF THE INVENTION

In view of the above, it is an object of this invention to remove the above-mentioned problems and to provide a wireless communication system, a wireless communication apparatus, and a resource assignment method used therein which are capable of improving characteristics when correlation between propagation paths is high and capable of achieving high throughput when the correlation between propagation paths is low.

A wireless communication system according to this invention uses a wireless communication apparatus having a plurality of transmission and reception antennas, the wireless communication apparatus comprising means for determining, upon producing first through M-th (M being an integer not smaller than 2) transmission signals, correspondence between first through K-th (K being an integer not smaller than 2) transmission sequences and frequency channels so that the correspondence is different for each transmission signal, and means for extracting and combining, upon producing first through K-th demodulated sequences, M demodulated signals corresponding to the first through the K-th transmission sequences in accordance with the correspondence between the first through the K-th transmission sequences and the frequency channels.

A wireless communication apparatus according to this invention has a plurality of transmission and reception antennas and comprises means for determining, upon producing first through M-th (M being an integer not smaller than 2) transmission signals, correspondence between first through K-th (K being an integer not smaller than 2) transmission sequences and frequency channels so that the correspondence is different for each transmission signal, and means for extracting and combining, upon producing first through K-th demodulated sequences, M demodulated signals corresponding to the first through the K-th transmission sequences in accordance with the correspondence between the first through the K-th transmission sequences and the frequency channels.

A resource assignment method according to this invention is used in a wireless communication system having a plurality of transmission and reception antennas and comprises the steps of determining, upon producing first through M-th (M being an integer not smaller than 2) transmission signals at the wireless communication apparatus, correspondence between first through K-th (K being an integer not smaller than 2) transmission sequences and frequency channels so that the correspondence is different for each transmission signal, and extracting and combining, upon producing first through K-th demodulated sequences, M demodulated signals corresponding to the first through the K-th transmission sequences in accordance with the correspondence between the first through the K-th transmission sequences and the frequency channels.

A program of a resource assignment method according to this invention is used in a wireless communication system using a wireless communication apparatus having a plurality of transmission and reception antennas and makes a computer execute a process of determining, upon producing first through M-th (M being an integer not smaller than 2) transmission signals, first through K-th (K being an integer not smaller than 2) transmission sequences and frequency channels so that the correspondence is different for each transmission signal, and a process of extracting and combining, upon producing first through K-th demodulated sequences, M demodulated signals corresponding to the first through the K-th transmission sequences in accordance with the correspondence between the first through the K-th transmission sequences and the frequency channels.

Thus, in a wireless transmission method, the same transmission sequence is assigned with a different frequency channel for each transmission antenna. In this manner, even if correlation between the propagation paths is high, a diversity effect is achieved. By adaptively controlling the number of transmission sequences, the number of frequency channels assigned to each transmission sequence, the number of transmission antennas assigned to each transmission sequence, and so on depending upon a communication quality, it is possible to improve characteristics when correlation between propagation paths is high and to achieve high throughput when correlation between the propagation paths is low.

In view of the above-mentioned respects, this invention has been made. By assigning the same transmission sequence with a different frequency channel for each transmission antenna and by adaptively controlling the number of transmission sequences, the number of frequency channels assigned to each transmission sequence, the number of transmission antennas assigned to each transmission sequence, and so on depending upon a communication quality, the above-mentioned problems can be resolved.

In order to solve the above-mentioned problems, a first wireless communication apparatus according to this invention comprises, in a transmitting portion, a coded sequence producing portion for encoding first through K-th (K being an integer not smaller than 2) transmission sequences to produce first through K-th coded sequences, respectively, an interleaved sequence producing portion for interleaving the first through the K-th coded sequences to produce first through K-th interleaved sequences, respectively, a partial transmission sequence producing portion for dividing each of the first through the K-th interleaved sequences into first through M-th (M being an integer not smaller than 2) partial transmission sequences, a transmission signal producing portion for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively.

The first wireless communication apparatus according to this invention comprises, in a receiving portion, first through N-th (N being an integer not smaller than 1) reception antennas, a demodulating portion for decomposing first through N-th reception signals received by the first through the N-th reception antennas into first through M-th partial demodulated signals for each frequency channel, a demodulated sequence producing portion for extracting and combining, from the first through the M-th partial demodulated signals for each frequency channel, M demodulated signals corresponding to each of the first through the K-th transmission sequences to thereby produce first through K-th demodulated sequences, a deinterleaved sequence producing portion for deinterleaving the first through the K-th demodulated sequences to produce first through K-th deinterleaved sequences, respectively, and a decoding portion for decoding the first through the K-th deinterleaved sequences to produce first through K-th decoded sequences, respectively.

The first wireless communication apparatus according to this invention is characterized in that the transmitting portion and the receiving portion described above are operable to determine, when the transmission signal producing portion produces the first through the M-th transmission signals, correspondence between the first through the K-th transmission sequences and the frequency channels so that the correspondence is different for each transmission signal and to extract and combine, when the demodulated sequence producing portion produces the first through the K-th demodulated sequences, M demodulated signals corresponding to the first through the K-th transmission sequences in accordance with the correspondence between the first through the K-th transmission sequences and the frequency channels which is determined in the transmission signal producing portion and different for each transmission signal.

A second wireless communication apparatus according to this invention comprises, in a transmitting portion, a scheduling portion for adaptively assigning wireless resources depending upon a communication path quality, a coded sequence producing portion for encoding first through K-th (K being an integer not smaller than 2) transmission sequences to produce first through K-th coded sequences, an interleaved sequence producing portion for interleaving the first through the K-th coded, sequences to produce first through K-th interleaved sequences, a partial transmission sequence producing portion for dividing each of the first through the K-th interleaved sequences into first through M-th (M being an integer not smaller than 2) partial transmission sequences, a transmission signal producing portion for frequency-multiplexing the first through the M-th partial transmission sequences corresponding to each of the first through the K-th transmission sequences with respect to each of the first through M-th partial transmission sequences to produce first through M-th transmission signals, and first through M-th transmission antennas for transmitting the first through the M-th transmission signals, respectively.

The second wireless communication apparatus according to this invention comprises, in a receiving portion, first through N-th (N being an integer not smaller than 1) reception antennas, a demodulating portion for decomposing first through N-th reception signals received by the first through the N-th reception antennas into first through M-th partial demodulated signals for each frequency channel, a demodulated sequence producing portion for extracting and combining, from the first through the M-th partial demodulated signals for each frequency channel, M demodulated signals corresponding to each of the first through the K-th transmission sequences to thereby produce first through K-th demodulated sequences, a deinterleaved sequence producing portion for deinterleaving the first through the K-th demodulated sequences to produce first through K-th deinterleaved sequences, respectively, and a decoding portion for decoding the first through the K-th deinterleaved sequences to produce first through K-th decoded sequences, respectively.

The second wireless communication apparatus according to this invention is characterized in that the transmitting portion and the receiving portion described above are operable to determine, when the transmission signal producing portion produces the first through the M-th transmission signals, correspondence between the first through the K-th transmission sequences and the frequency channels so that the correspondence is different for each transmission signal and to extract and combine, when the demodulated sequence producing portion produces the first through the K-th demodulated sequences, M demodulated signals corresponding to the first through the K-th transmission sequences in accordance with the correspondence between the first through the K-th transmission sequences and the frequency channels which is determined in the transmission signal producing portion and different for each transmission signal, and that the scheduling portion reduces any one of the number of the transmission sequences, the number of the frequency channels to be assigned to the transmission sequences, and the number of the transmission antennas to be assigned to the transmission sequences when a reception quality in the receiving portion is lower than a first threshold value and increases any one of the number of the transmission sequences, the number of the frequency channels to be assigned to the transmission sequences, and the number of the transmission antennas to be assigned to the transmission sequences when the reception quality in the receiving portion is higher than a second threshold value.

A third wireless communication apparatus according to this invention comprises, in a transmitting portion, a coded sequence producing portion for encoding first through K-th (K being an integer not smaller than 2) transmission sequences to produce first through K-th coded sequences, respectively, an interleaved sequence producing portion for interleaving the first through the K-th coded sequences to produce first through K-th interleaved sequences, a partial transmission sequence producing portion for dividing each of the first through the K-th interleaved sequences into first through M-th (M being an integer not smaller than 2) partial transmission sequences, a transmission signal producing portion for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively.

The third wireless communication apparatus according to this invention comprises, in a receiving portion, first through N-th (N being an integer not smaller than 1) reception antennas, a demodulating portion for decomposing first through N-th reception signals received by the first through the N-th reception antennas into first through M-th partial demodulated signals for each frequency channel, a demodulated sequence producing portion for extracting and combining, from the first through the M-th partial demodulated signals for each frequency channel, M demodulated signals corresponding to each of the first through the K-th transmission sequences to produce first through K-th demodulated sequences, a deinterleaved sequence producing portion for deinterleaving the first through the K-th demodulated sequences to produce first through K-th deinterleaved sequences, respectively, a decoding portion for decoding the first through the K-th deinterleaved sequences to produce first through K-th decoded sequences, respectively, and a scheduling portion for adaptively assigning wireless resources depending upon a communication path quality.

The third wireless communication apparatus according to this invention is characterized in that the transmitting portion and the receiving portion described above are operable to determine, when the transmission signal producing portion produces the first through the M-th transmission signals, correspondence between the first through the K-th transmission sequences and the frequency channels so that the correspondence is different for each transmission signal and to extract and combine, when the demodulated sequence producing portion produces the first through the K-th demodulated sequences, M demodulated signals corresponding to the first through the K-th transmission sequences in accordance with the correspondence between the first through the K-th transmission sequences and the frequency channels which is determined in the transmission signal producing portion and different for each transmission signal, and that the scheduling portion reduces any one of the number of the transmission sequences, the number of the frequency channels to be assigned to the transmission sequences, and the number of the transmission antennas to be assigned to the transmission sequences when a reception quality in the receiving portion is lower than a first threshold value and increases any one of the number of the transmission sequences, the number of the frequency channels to be assigned to the transmission sequences, and the number of the transmission antennas to be assigned to the transmission sequences when the reception quality in the receiving portion is higher than a second threshold value.

With the structure and the operation which will hereinafter be described, this invention achieves the effect of improving characteristics when correlation between propagation paths is high and of realizing high throughput when correlation between propagation paths is low.

BRIEF DESCRIPTION OF THE DRAWING

FIGS. 15A and 15B are views for describing resource assignment in a fourth example of this invention.

BEST MODE FOR EMBODYING THE INVENTION

Figure 6:
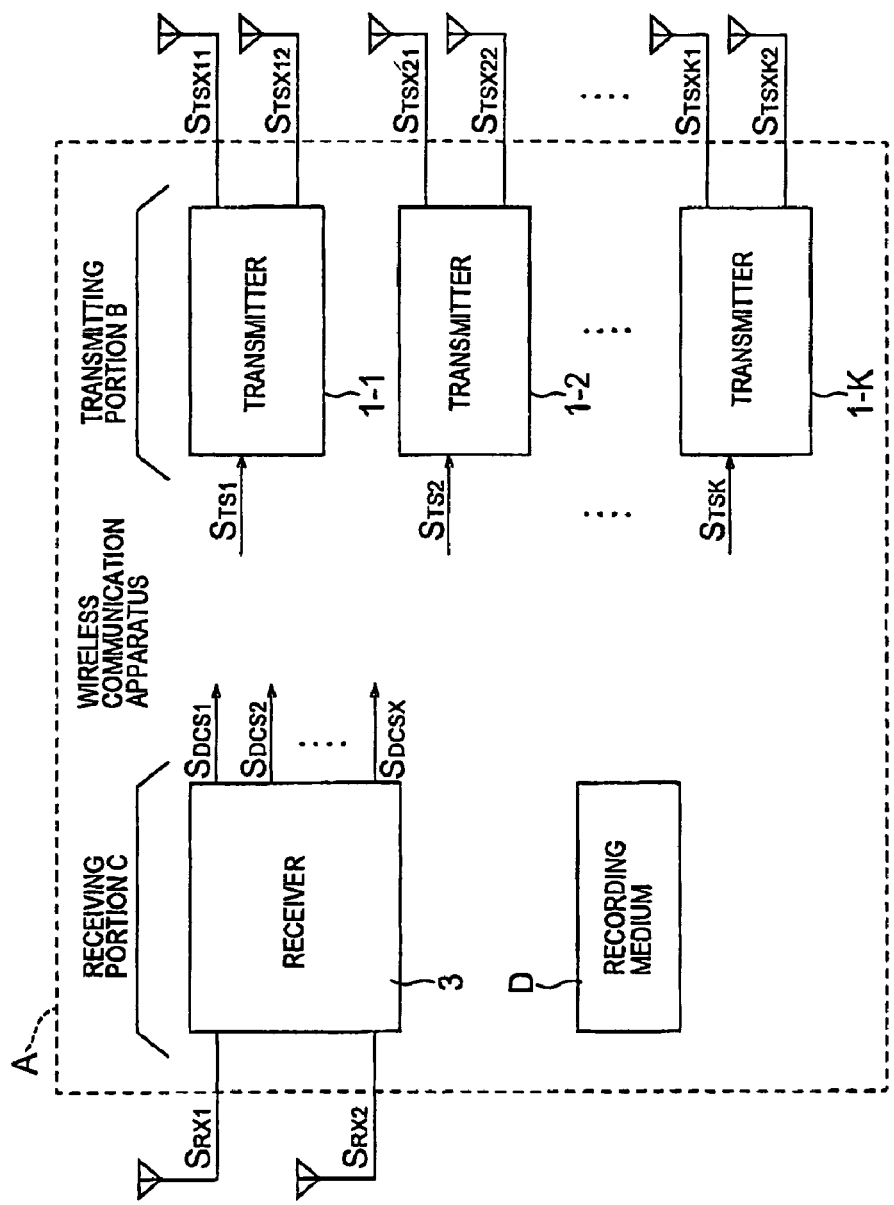
FIG. 6 is a block diagram showing a structure of a wireless communication apparatus according to an embodiment of this invention.

Next, an embodiment of this invention will be described with reference to the drawing. FIG. 6 is a block diagram showing a structure of a wireless communication apparatus according to the embodiment of this invention. In FIG. 6, the wireless communication apparatus A includes a transmitting portion B comprising transmitters 1-1 to 1-K, a receiving portion C comprising a receiver 3, and a recording medium D storing a program (program executable by a computer) to be executed by the transmitting portion B and the receiving portion C and adapted to realize processes at these portions.

Figure 7:
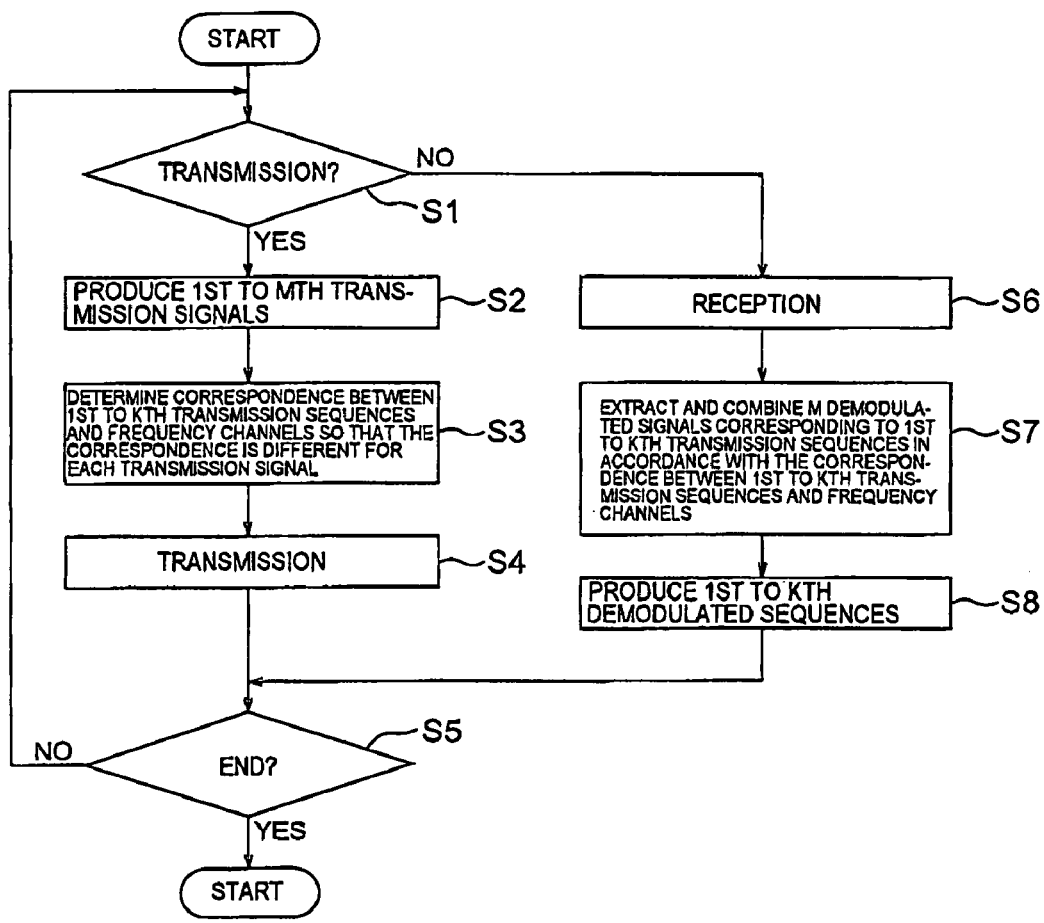
FIG. 7 is a flow chart showing an operation of the wireless communication apparatus according to the embodiment of this invention.

FIG. 7 is a flow chart showing an operation of the wireless communication apparatus A in FIG. 6. Referring to FIGS. 6 and 7, description will be made of the operation of the wireless communication apparatus A according to the embodiment of this invention. The process illustrated in FIG. 7 can be realized by making the transmitting portion B and the receiving portion C in the wireless communication apparatus A execute the program of the recording medium D.

In case where the wireless communication apparatus A carries out transmission (step S1 in FIG. 7), each of the transmitters 1-1 to 1-K produces first through M-th transmission signals (step S2 in FIG. 7), determines correspondence between first through K-th transmission sequences and frequency channels (step S3 in FIG. 7) so that the correspondence is different for each transmission signal, and transmits the transmission signals (step S4 in FIG. 7).

On the other hand, in case where reception is carried out (step S1 in FIG. 7), the wireless communication apparatus A receives a signal sent thereto (step S6 in FIG. 7), extracts and combines M demodulated signals corresponding to each of the first through the K-th transmission sequences in accordance with the correspondence between the first through the K-th transmission sequences and the frequency channels (step S7 in FIG. 7), and produces first through K-th demodulated sequences with reference to the result thereof (step S8 in FIG. 7). Until an end (step S5 in FIG. 7), the wireless communication apparatus A repeatedly carries out the above-mentioned process.

By the above-mentioned operation, the embodiment of this invention is capable of improving characteristics when correlation between propagation paths is high and of realizing high throughput when correlation between propagation paths is low.

Example 1

Figure 8:
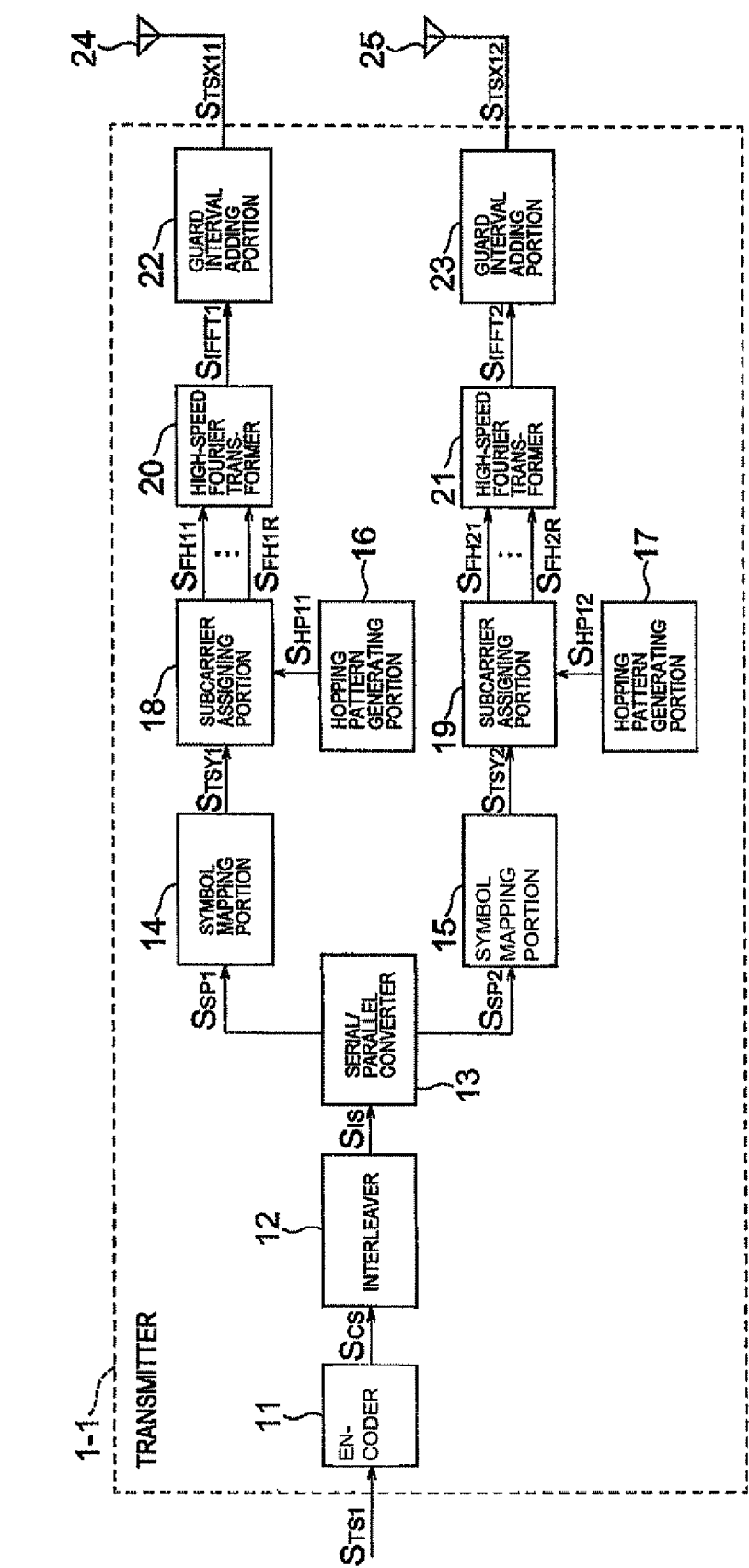
FIG. 8 is a block diagram showing a structure of a transmitter according to a first example of this invention.
Figure 9:
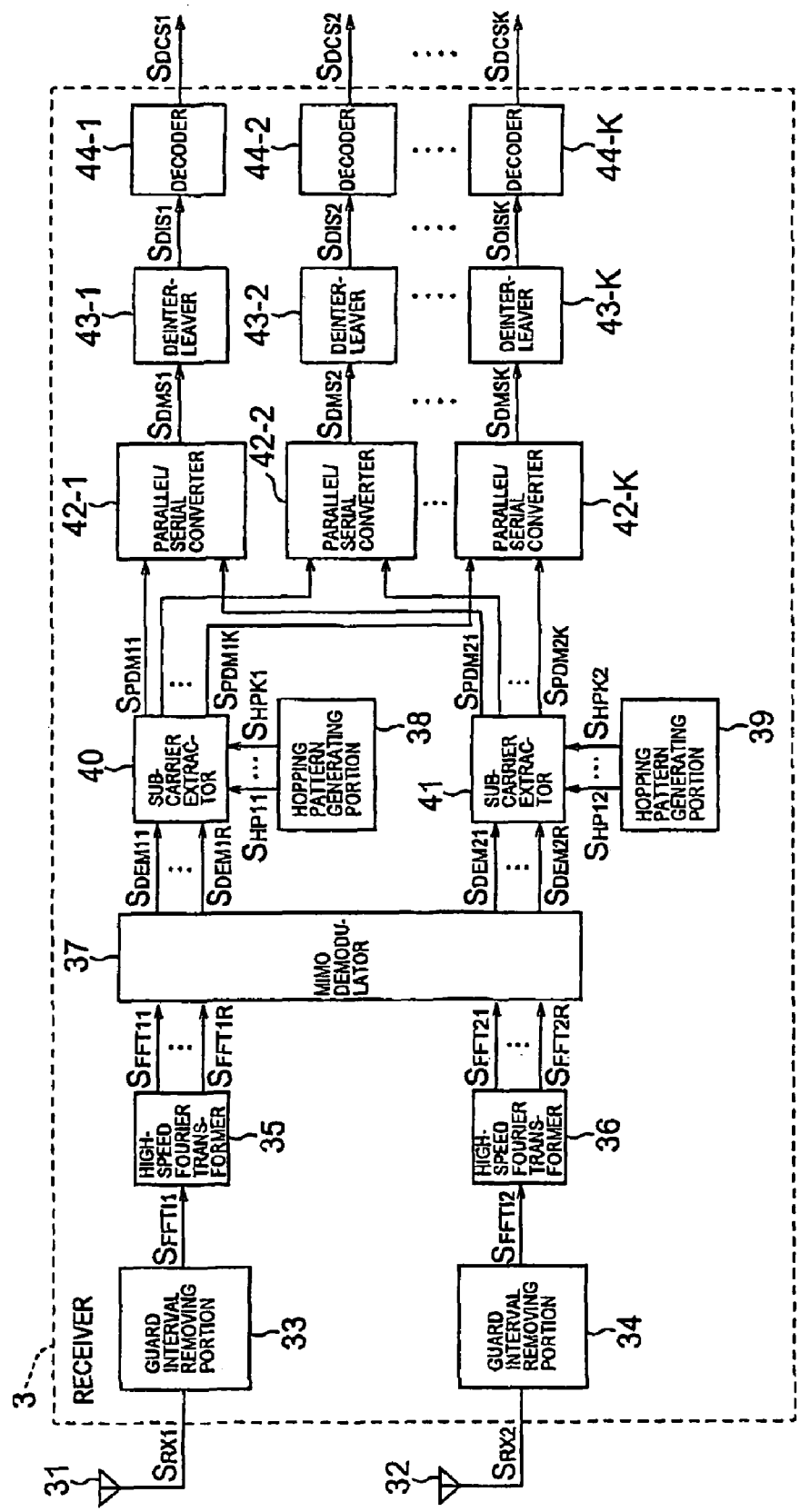
FIG. 9 is a block diagram showing a structure of a receiver according to the first example of this invention.

FIG. 8 is a block diagram showing a structure of a transmitter according to a first example of this invention and FIG. 9 is a block diagram showing a structure of a receiver according to the first example of this invention. A wireless communication apparatus according to the first example of this invention is similar in structure to the above-mentioned wireless communication apparatus according to the embodiment of this invention illustrated in FIG. 6.

Referring to FIG. 8, a transmitter 1-1 comprises an encoder 11, an interleaver 12, a serial/parallel converter 13, symbol mapping portions 14 and 15, hopping pattern generating portions 16 and 17, subcarrier assigning portions 18 and 19, high-speed inverse Fourier transformers 20 and 21, guard interval adding portions 22 and 23, and antennas 24 and 25. Transmitters 1-2 to 1-K are similar in structure to the above-mentioned transmitter 1-1.

In the transmitter 1-1, the encoder 11 encodes a transmission sequence $S_{TS1}$ and produces a coded sequence $S_{CS}$. The interleaver 12 interleaves the coded sequence $S_{CS}$ and produces an interleaved sequence $S_{IS}$. The serial/parallel converter 13 carries out serial/parallel conversion upon the interleaved sequence $S_{IS}$ and produces serial/parallel signals $S_{SP1}$ and $S_{SP2}$.

The symbol mapping portions 14 and 15 map the serial/parallel signals $S_{SP1}$ and $S_{SP2}$ into modulated symbols and produce transmission symbol sequences $S_{TSY}$ and $S_{TSY2}$, respectively. The hopping pattern generating portions 16 and 17 produce hopping patterns $S_{HP11}$ and $S_{HP12}$ independent from each other and unique to the transmitter. According to the hopping patterns $S_{HP11}$ and $S_{HP12}$, the subcarrier assigning portions 18 and 19 assign the transmission symbol sequences $S_{TSY1}$ and $S_{TSY2}$ to subcarriers 1 to R and produce frequency hopping signals $S_{FH11}$ to $S_{FH1R}$ and $S_{FH21}$ to $S_{FH2R}$, respectively.

The high-speed inverse Fourier transformers 20 and 21 carry out high-speed inverse Fourier transform upon the frequency hopping signals $S_{FH11}$ to $S_{FH1R}$ and $S_{FH21}$ to $S_{FH2R}$ and produce IFFT signals $S_{IFFT1}$ and $S_{IFFT2}$. The guard interval adding portions 22 and 23 add guard intervals to the IFFT signals $S_{IFFT1}$ and $S_{IFFT2}$ and deliver transmission signals $S_{TSX11}$ and $S_{TSX12}$ through the antennas 24 and 25.

The transmitters 1-2 to 1-K are operated in the manner similar to the above-mentioned transmitter 1-1 and, in response to transmission sequences $S_{TS2}$ to $S_{TSK}$, produce transmission signals $S_{TSX21}$, $S_{TSX22}$, ..., $S_{TSXK1}$, $S_{TSXK2}$, respectively.

Referring to FIG. 9, a receiver 3 comprises antennas 31 and 32, guard interval removing portions 33 and 34, high-speed Fourier transformers 35 and 36, a MIMO (Multiple-Input Multiple-Output) demodulating portion 37, hopping pattern generating portions 38 and 39, subcarrier extracting portions 40 and 41, parallel/serial converters 42-1 to 42-K, deinterleavers 43-1 to 43-K, and decoders 44-1 to 44-K.

In the receiver 3, the guard interval removing portions 33 and 34 remove the guard intervals from reception signals $S_{RX1}$ and $S_{RX2}$ supplied to the antennas 31 and 32 and produce FFT input signals $S_{FFTI1}$ and $S_{FFTI2}$, respectively. The high-speed Fourier transformers 35 and 36 perform high-speed Fourier transform upon the FFT input signals $S_{FFTI1}$ and $S_{FFTI2}$ and produce FFT signals $S_{FFT11}$ to $S_{FFT1R}$ and $S_{FFT21}$ to $S_{FFT2R}$, respectively.

The MIMO demodulating portion 37 combines and decomposes the FFT signals $S_{FFT11}$ to $S_{FFT1R}$ and $S_{FFT21}$ to $S_{FFT2R}$ and produces demodulated signals $S_{DEM11}$ to $S_{DEM1R}$ and $S_{DEM21}$ to $S_{DEM2R}$. The hopping pattern generating portions 38 and 39 produce unique hopping patterns $S_{HP11}$ to $S_{HPK1}$ and $S_{HP12}$ to $S_{HPK2}$ corresponding to the transmitters 1-1 to 1-K, respectively. The subcarrier extracting portions 40 and 41 extract, from the demodulated signals $S_{DEM11}$ to $S_{DEM1R}$ and $S_{DEM21}$ to $S_{DEM2R}$, components corresponding to the hopping patterns $S_{HP11}$ to $S_{HPK1}$ and $S_{HP12}$ to $S_{HPK2}$, and outputs the components as partial demodulated sequences $S_{PDM11}$ to $S_{PDM1K}$ and $S_{PDM21}$ to $S_{PDM2K}$, respectively.

The parallel/serial converters 42-1 to 42-K carry out parallel/serial conversion upon the partial demodulated sequences $S_{PDM11}$ to $S_{PDM1K}$ and $S_{PDM21}$ to $S_{PDM2K}$ and produce demodulated sequences $S_{DMS1}$ to $S_{DMSK}$. The deinterleavers 43-1 to 43-K deinterleave the demodulated sequences $S_{DMS1}$ to $S_{DMSK}$ and produce deinterleaved sequences $S_{DIS1}$ to $S_{DISK}$, respectively. The decoders 44-1 to 44-K decode the deinterleaved sequences $S_{DIS1}$ to $S_{DMSK}$ and produce decoded sequences $S_{DCS1}$ to $S_{DCSK}$, respectively.

Figure 10:
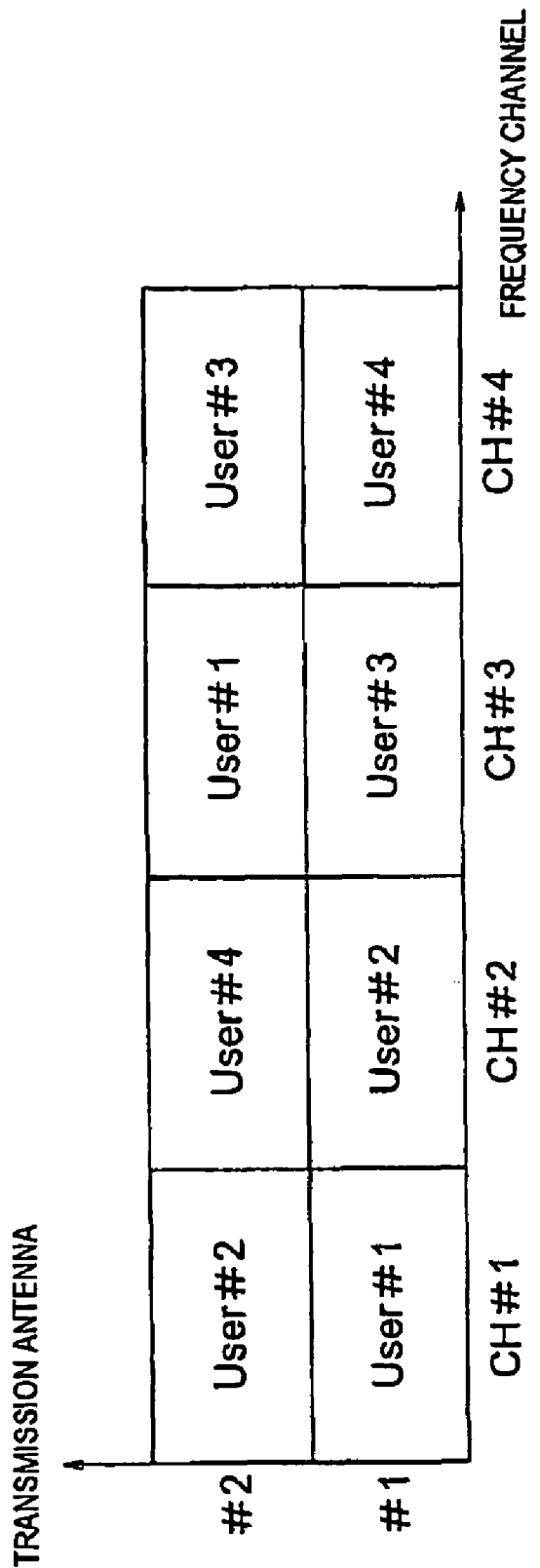
FIG. 10 is a view for describing resource assignment in the first example of this invention.

FIG. 10 is a view for describing resource assignment in the first example of this invention. Referring to FIG. 10, description will be made of the resource assignment in the first example of this invention.

Figure 1:
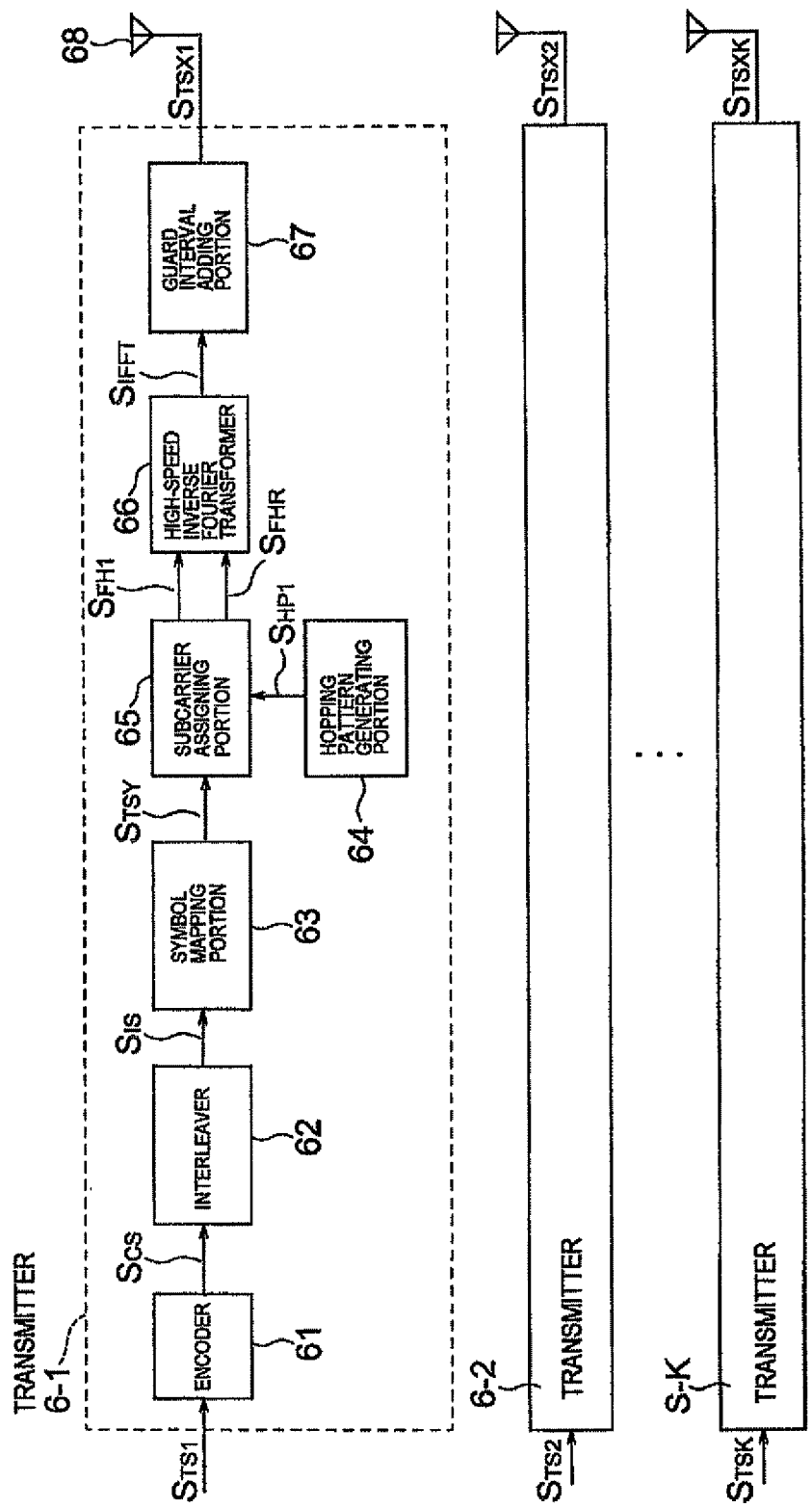
FIG. 1 is a block diagram showing an example of a structure of a transmitting portion of an existing wireless communication apparatus.
Figure 2:
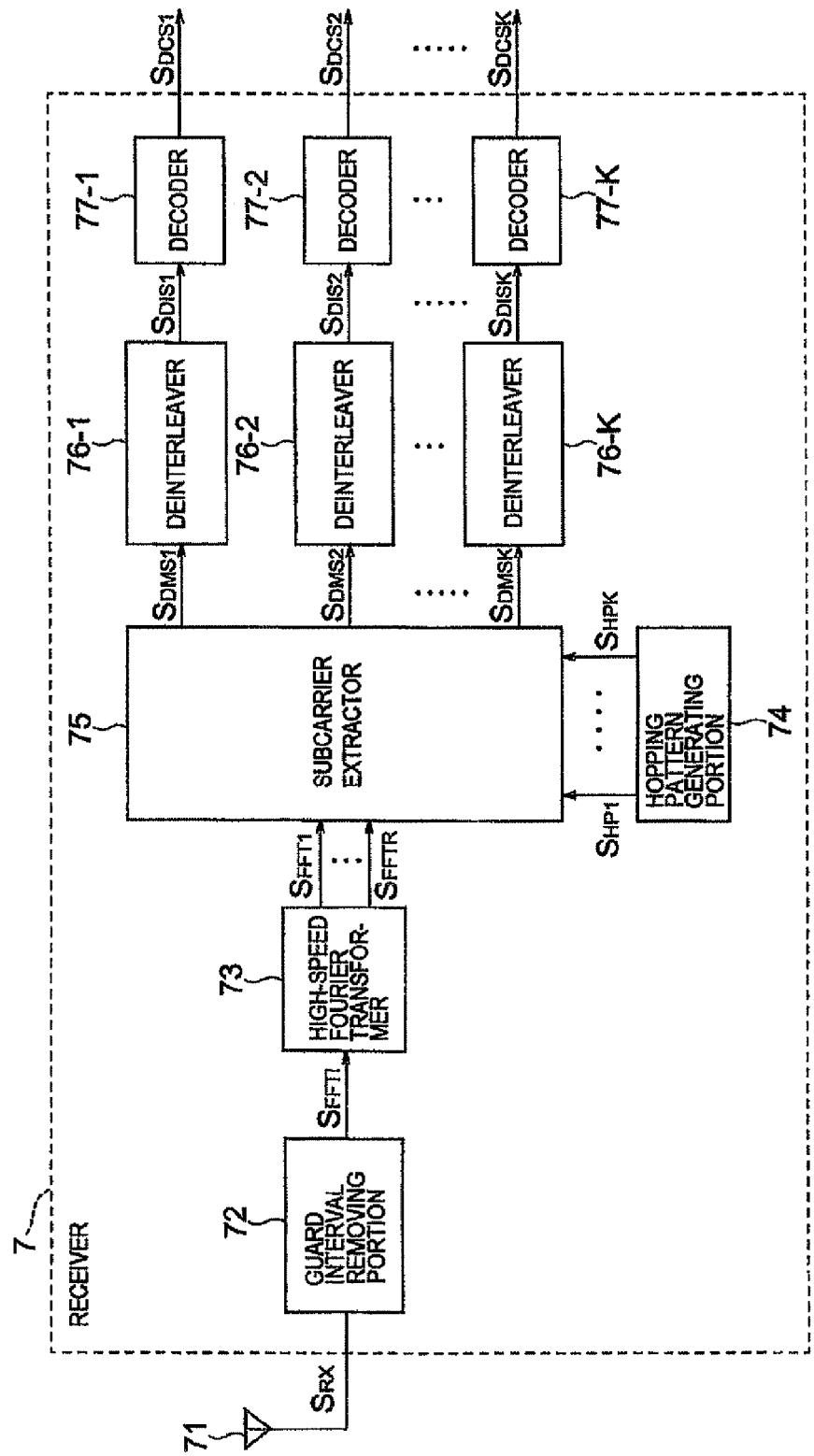
FIG. 2 is a block diagram showing an example of a structure of a receiving portion of the existing wireless communication apparatus.
Figure 3:
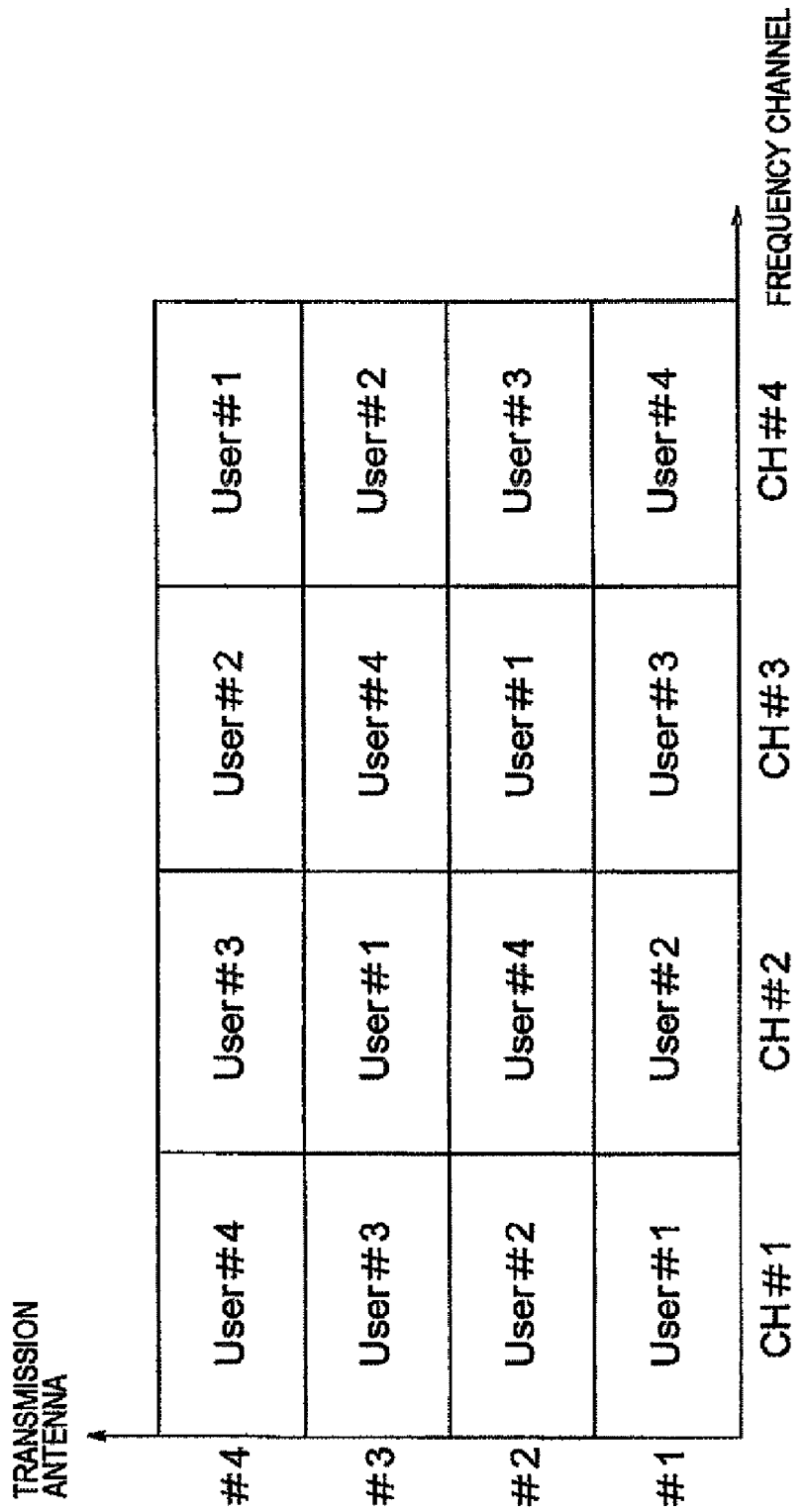
FIG. 3 is a view for describing resource assignment in the existing apparatus.
Figure 4:
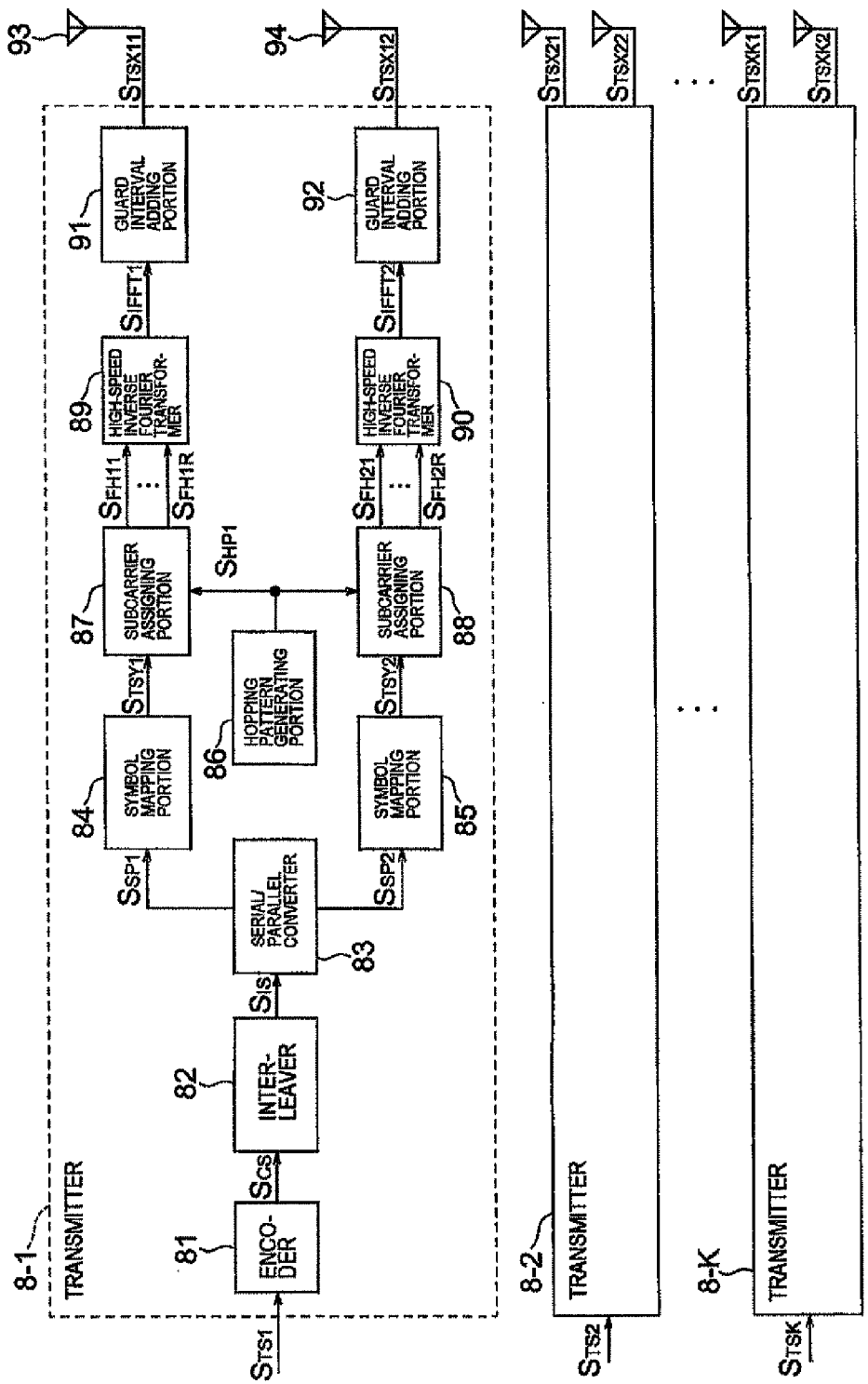
FIG. 4 is a block diagram showing another example of a structure of a transmitting portion of the existing wireless communication apparatus.
Figure 5:
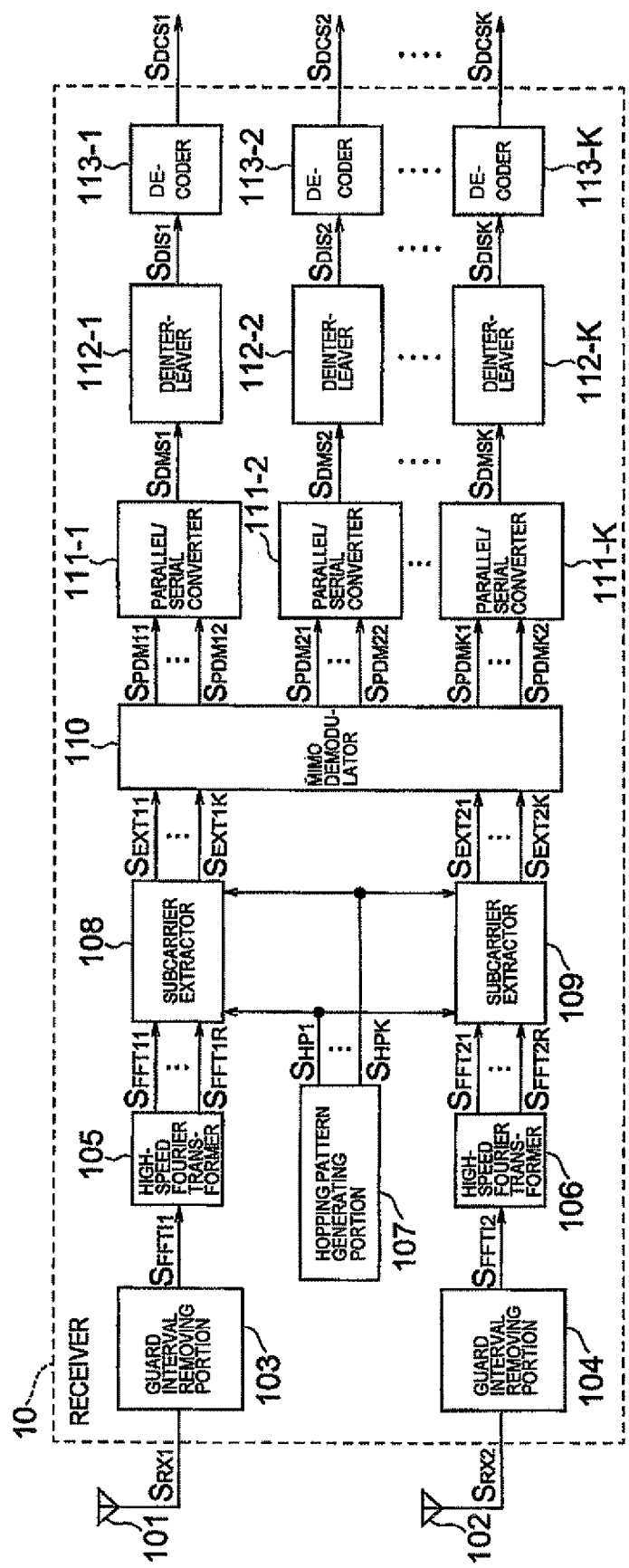
FIG. 5 is a block diagram showing another example of a structure of a receiving portion of the existing wireless communication apparatus.

In this example, transmission and reception using a different frequency hopping pattern for each of the transmission antennas of the transmitters 1-1 to 1-K are carried out by the above-mentioned operation. In the conventional example, MIMO demodulation is carried out after extracting the subcarriers by the hopping patterns, as illustrated in FIG. 5. In this example, the hopping pattern is different for each of the transmission antennas of the transmitters 1-1 to 1-K. Therefore, it is necessary to extract the subcarriers by the respective hopping patterns after MIMO demodulation and subsequent decomposition into the demodulated signals corresponding to the respective transmission antennas.

For example, consideration will be made about the case where transmission sequences correspond to different users, respectively, and the number of the transmission sequences is equal to four and the number of the frequency channels is equal to four. Users #1 to #4 perform frequency hopping using hopping patterns {#1, ... }, {#2, ... }, {#3, ... }, {#4, ... } for the transmission antenna #1 and using hopping patterns {#3, ... }, {#1, ... }, {#4, ... }, {#2, ... } for the transmission antenna #2. In this event, frequency channel assignment at a time instant #1 is as shown in FIG. 10.

Each user uses different frequency channels for the transmission antennas #1 and #2. Even if correlation between propagation paths is large, propagation path characteristics are independent in wide-band communication. Therefore, a frequency diversity effect is achieved.

Thus, in this example, the same transmission sequence is assigned with a different frequency channel for each transmission antenna. Therefore, even if correlation between propagation paths is high, the diversity effect is obtained.

Example 2

Figure 11:
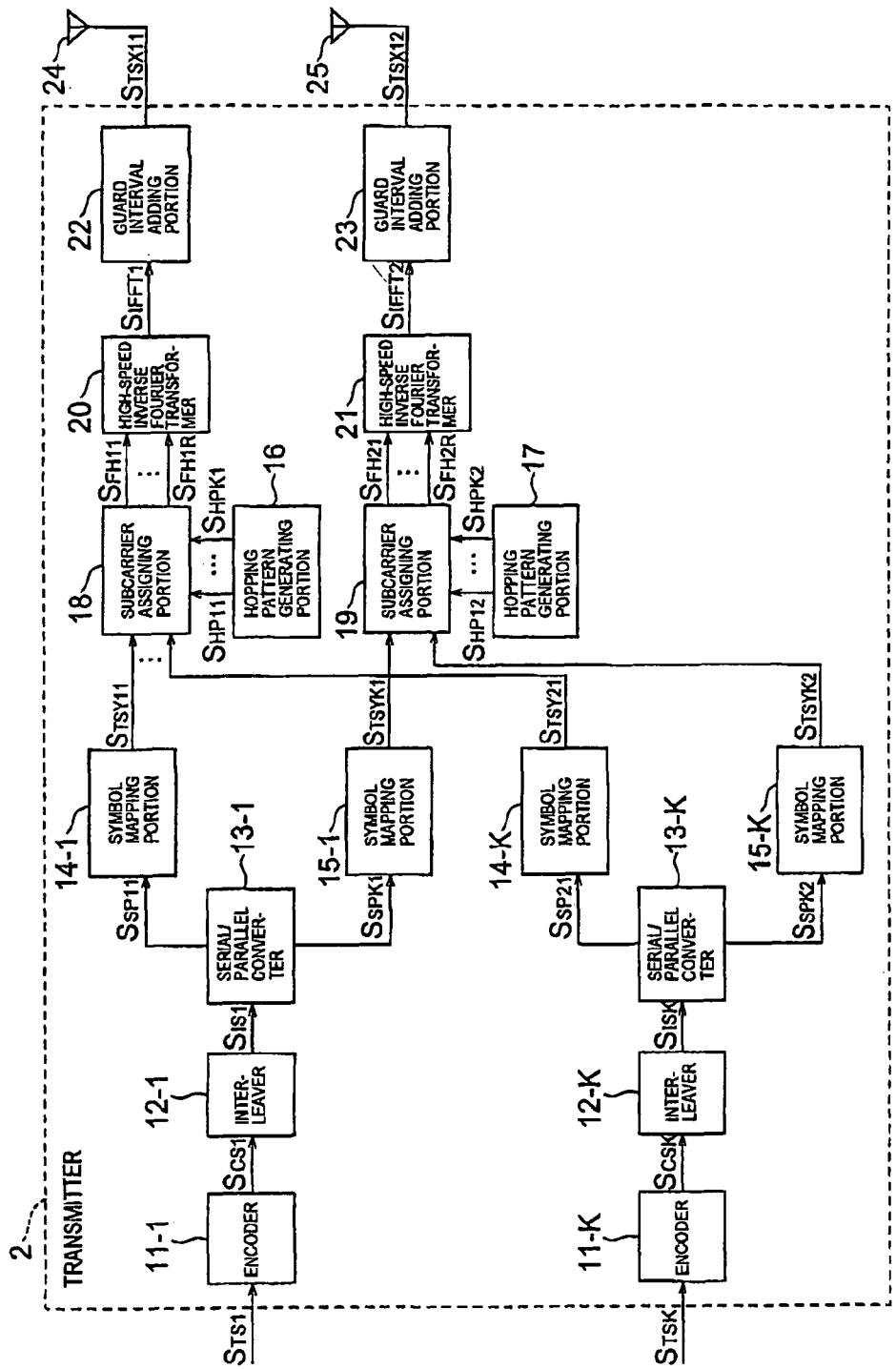
FIG. 11 is a block diagram showing a structure of a transmitting portion of a wireless communication apparatus according to a second example of this invention.
Figure 12:
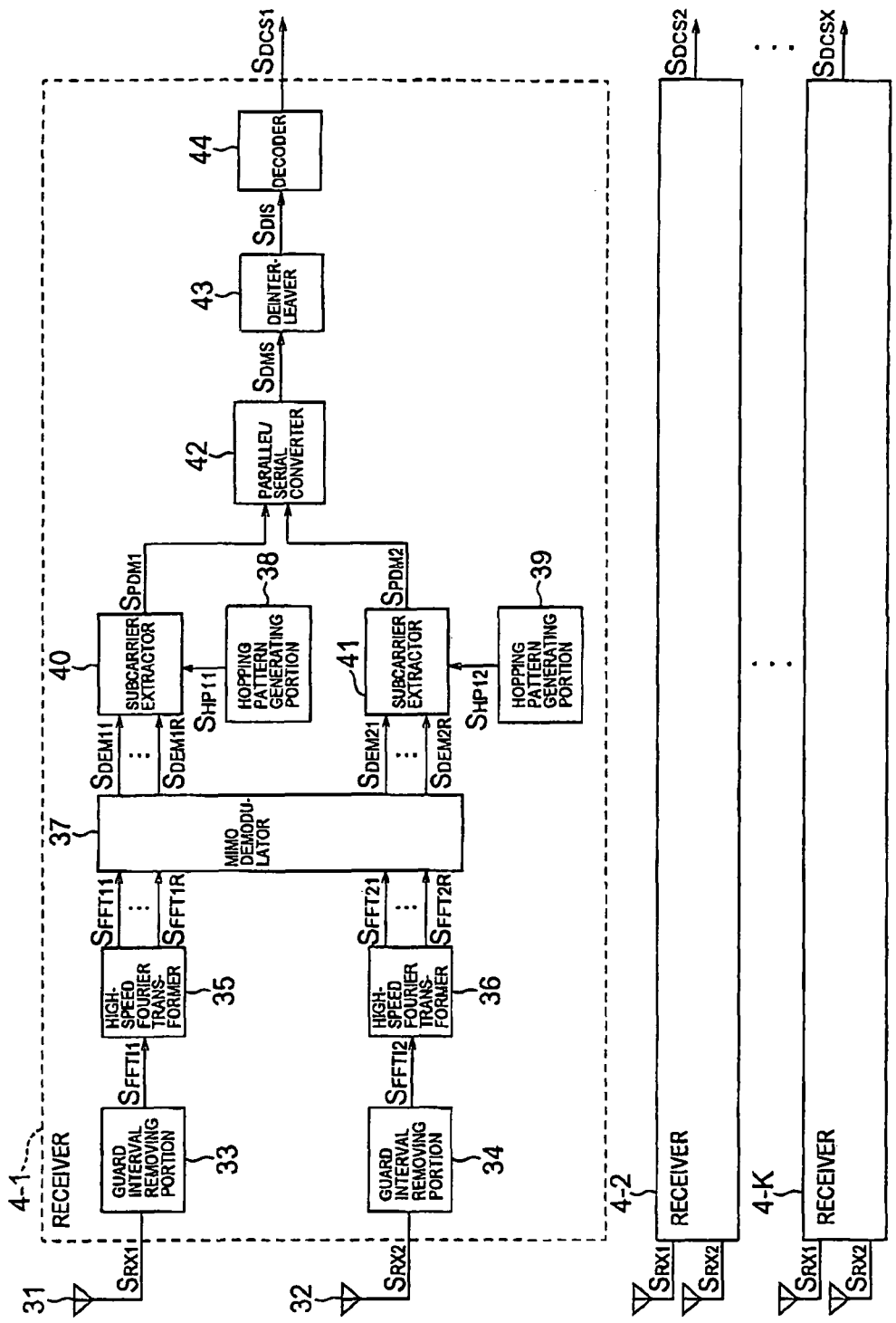
FIG. 12 is a block diagram showing a structure of a receiving portion of the wireless communication apparatus according to the second example of this invention.

FIG. 11 is a block diagram showing a structure of a transmitting portion of a wireless communication apparatus according to a second example of this invention and FIG. 12 is a block diagram showing a structure of a receiving portion of the wireless communication apparatus according to the second example of this invention. In the first example of this invention, description has been made about the wireless apparatus comprising a plurality of transmitters 1-1 to 1-K and one receiver 3. In the second example of this invention, this invention is readily applicable to a wireless apparatus comprising one transmitter 2 and a plurality of receivers 4-1 to 4-K as illustrated in FIGS. 11 and 12.

Referring to FIG. 11, the transmitting portion of the wireless communication apparatus according to the second example of this invention comprises the transmitter 2. The transmitter 2 comprises encoders 11-1 to 11-K, interleavers 12-1 to 12-K, serial/parallel converters 13-1 to 13-K, symbol mapping portions 14-1 to 14-K and 15-1 to 15-K, hopping pattern generating portions 16 and 17, subcarrier assigning portions 18 and 19, high-speed inverse Fourier transformers 20 and 21, guard interval adding portions 22 and 23, and antennas 24 and 25.

In the transmitter 2, the encoders 11-1 to 11-K encode transmission sequences $S_{TS1}$ to $S_{TSK}$ and produce coded sequences $S_{CS1}$ to $S_{CSK}$. The interleavers 12-1 to 12-K interleave the coded sequences $S_{CS1}$ to $S_{CSK}$ and produce interleaved sequences $S_{IS1}$ to $S_{ISK}$. The serial/parallel converters 13-1 to 13-K carry out serial/parallel conversion upon the interleaved sequences $S_{IS1}$ to $S_{ISK}$ and produce serial/parallel signals $S_{SP11}$ to $S_{SPK1}$ and $S_{SP21}$ to $S_{SPK2}$.

The symbol mapping portions 14-1 to 14-K and 15-1 to 15-K map the serial/parallel signals $S_{SP11}$ to $S_{SPK1}$ and $S_{SP21}$ to $S_{SPK2}$ into modulated symbols and produce transmission symbol sequences $S_{TSY11}$ to $S_{TSYK1}$ and $S_{TSY21}$ to $S_{TSYK2}$, respectively. The hopping pattern generating portions 16 and 17 produce hopping patterns $S_{HP11}$ to $S_{HPK1}$ and $S_{HP12}$ to $S_{HPK2}$ independent from each other and unique to the transmitter. According to the hopping patterns $S_{HP11}$ to $S_{HPK1}$ and $S_{HP12}$ to $S_{HPK2}$, the subcarrier assigning portions 18 and 19 assign the transmission symbol sequences $S_{TSY1}$ to $S_{TSYK1}$ and $S_{TSY21}$ to $S_{TSYK2}$ to subcarriers 1 to R and produce frequency hopping signals $S_{FH11}$ to $S_{FH1R}$ and $S_{FH21}$ to $S_{FH2R}$, respectively.

The high-speed inverse Fourier transformers 20 and 21 carry out high-speed inverse Fourier transform upon the frequency hopping signals $S_{FH11}$ to $S_{FH1R}$ and $S_{FH21}$ to $S_{FH2R}$ and produce IFFT signals $S_{IFFT1}$ and $S_{IFFT2}$. The guard interval adding portions 22 and 23 add guard intervals to the IFFT signals $S_{IFFT1}$ and $S_{IFFT2}$ and deliver transmission signals $S_{TSX11}$ and $S_{TSX12}$ through the antennas 24 and 25.

Referring to FIG. 12, the receiving portion of the wireless communication apparatus according to the second example of this invention comprises receivers 4-1 to 4-K. The receiver 4-1 comprises antennas 31 and 32, guard interval removing portions 33 and 34, high-speed Fourier transformers 35 and 36, a MIMO (Multiple-Input Multiple-Output) demodulating portion 37, hopping pattern generating portions 38 and 39, subcarrier extracting portions 40 and 41, a parallel/serial converter 42, a deinterleaver 43, and a decoder 44. The receivers 4-2 to 4-K are similar in structure to the above-mentioned receiver 4-1.

In the receiver 4-1, the guard interval removing portions 33 and 34 remove the guard intervals from reception signals $S_{RX1}$ and $S_{RX2}$ supplied to the antennas 31 and 32 and produce FFT input signals $S_{FFTI1}$ and $S_{FFTI2}$, respectively. The high-speed Fourier transformers 35 and 36 perform high-speed Fourier transform upon the FFT input signals $S_{FFTI1}$ and $S_{FFTI2}$ and produce FFT signals $S_{FFT11}$ to $S_{FFT1R}$ and $S_{FFT21}$ to $S_{FFT2R}$, respectively.

The MIMO demodulating portion 37 combines and decomposes the FFT signals $S_{FFT11}$ to $S_{FFT1R}$ and $S_{FFT21}$ to $S_{FFT2R}$ and produces demodulated signals $S_{DEM11}$ to $S_{DEM1R}$ and $S_{DEM21}$ to $S_{DEM2R}$. The hopping pattern generating portions 38 and 39 produce unique hopping patterns $S_{HP11}$ and $S_{HP12}$ corresponding to the transmitter 2, respectively. The subcarrier extracting portions 40 and 41 extract, from the demodulated signals $S_{DEM11}$ to $S_{DEM1R}$ and $S_{DEM21}$ to $S_{DEM2R}$, components corresponding to the hopping patterns $S_{HP11}$ and $S_{HP12}$, and output the components as partial demodulated sequences $S_{PDM11}$ and $S_{PDM21}$, respectively.

The parallel/serial converter 42 carries out parallel/serial conversion upon the partial demodulated sequences $S_{PDM11}$ and $S_{PDM21}$ and produces a demodulated sequence $S_{DMS}$. The deinterleaver 43 deinterleaves the demodulated sequence $S_{DMS}$ and produces a deinterleaved sequence $S_{DIS}$. The decoder 44 decodes the deinterleaved sequence $S_{DIS}$ and produces a decoded sequence $S_{DCS1}$.

Thus, in this example, the same transmission sequence is assigned with a different frequency channel for each transmission antenna. Therefore, even if correlation between propagation paths is high, the diversity effect is obtained.

Example 3

Figure 13:
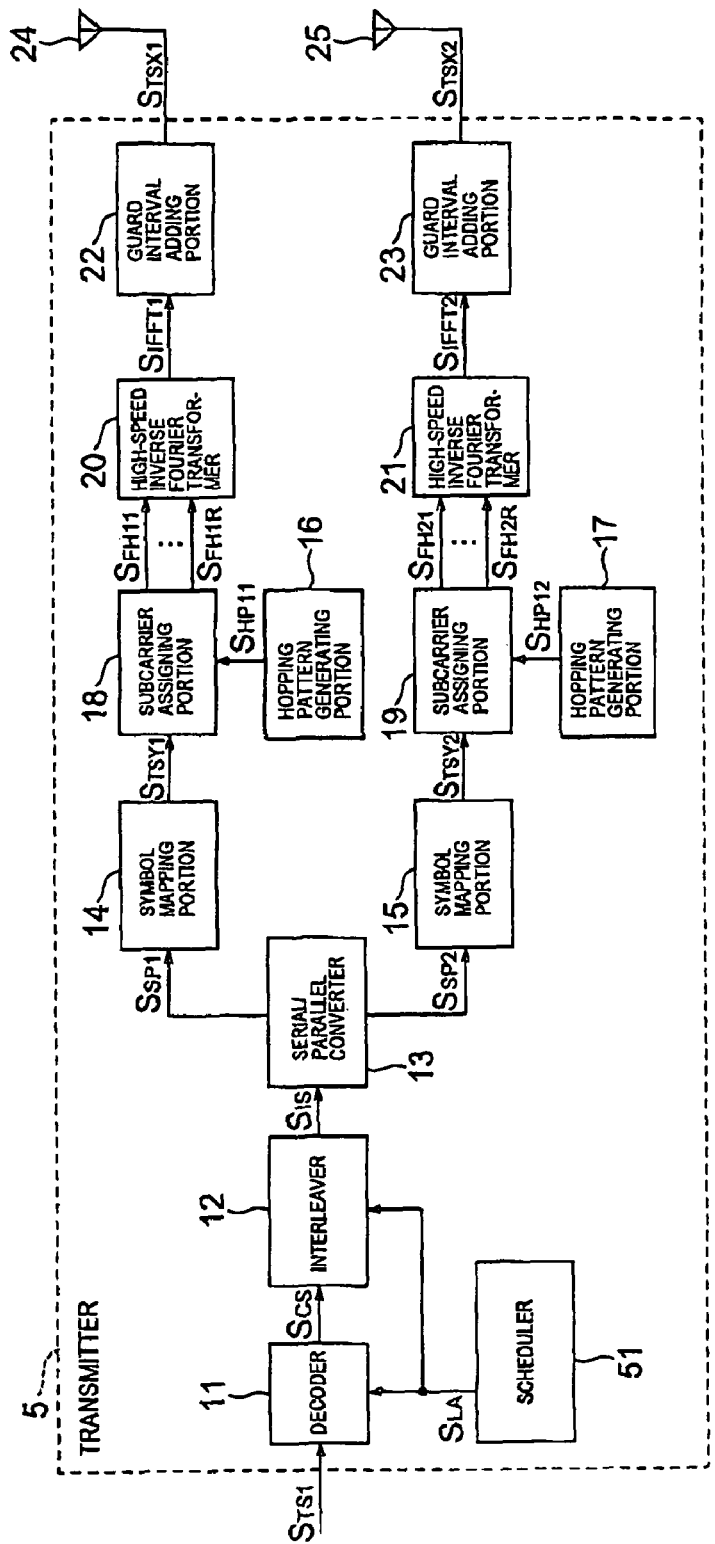
FIG. 13 is a block diagram showing a structure of a transmitting portion of a wireless communication apparatus according to a third example of this invention.

FIG. 13 is a block diagram showing a structure of a transmitting portion of a wireless communication apparatus according to a third example of this invention. The third example of this invention is similar in structure to the transmitters 1-1 to 1-K and the receiver 3 according to the first example of this invention illustrated in FIGS. 8 and 9 except that the transmitting portion has different structure. In other words, a receiver of the wireless communication apparatus according to the third example of this invention is similar in structure to the receiver 3 according to the first example of this invention illustrated in FIG. 9 and therefore, description thereof is omitted.

Referring to FIG. 13, a transmitter 5 is similar in structure to the transmitter 1-1 illustrated in FIG. 8 except that a scheduler 51 is added. Similar parts are designated by like reference numerals. The similar parts are similar to those of the first example of this invention.

In the transmitter 5, the scheduler 51 determines resource assignment with reference to a reception quality measured at the receiver 3 and produces a resource assignment signal $S_{LA}$. An encoder 11 encodes a transmission sequence $S_{TS1}$ having a length corresponding to the resource assignment signal $S_{LA}$ and produces a coded sequence $S_{CS}$. An interleaver 12 interleaves the coded sequence $S_{CS}$ having a length corresponding to the resource assignment signal $S_{LA}$ and produces an interleaved sequence $S_{IS}$. A serial/parallel converter 13 carries out serial/parallel conversion upon the interleaved sequence $S_{IS}$ and produces serial/parallel signals $S_{SP1}$ and $S_{SP2}$.

Symbol mapping portions 14 and 15 map the serial/parallel signals $S_{SP1}$ and $S_{SP2}$ into modulated symbols and produce transmission symbol sequences $S_{TSY}$ and $S_{TSY2}$, respectively. Hopping pattern generating portions 16 and 17 produce hopping patterns $S_{HP11}$ and $S_{HP12}$ independent from each other and unique to the transmitter. According to the hopping patterns $S_{HP11}$ and $S_{HP12}$, subcarrier assigning portions 18 and 19 assign the transmission symbol sequences $S_{TSY1}$ and $S_{TSY2}$ to subcarriers 1 to R and produce frequency hopping signals $S_{FH11}$ to $S_{FH1R}$ and $S_{FH21}$ to $S_{FH2R}$, respectively.

High-speed inverse Fourier transformers 20 and 21 carry out high-speed inverse Fourier transform upon the frequency hopping signals $S_{FH11}$ to $S_{FH1R}$ and $S_{FH21}$ to $S_{FH2R}$ and produce IFFT signals $S_{IFFT1}$ and $S_{IFFT2}$. Guard interval adding portions 22 and 23 add guard intervals to the IFFT signals $S_{IFFT1}$ and $S_{IFFT2}$ and produce transmission signals $S_{TSX11}$ and $S_{TSX12}$.

Figure 14A:
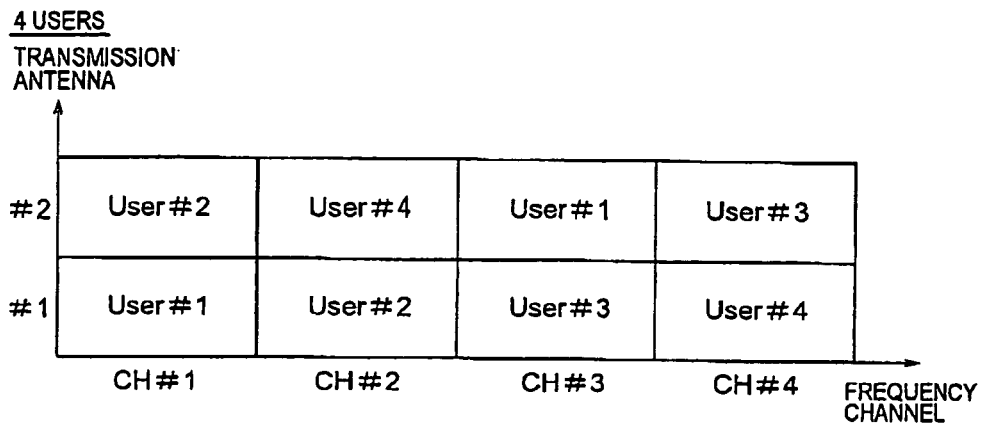
FIGS. 14A to 14C are views for describing resource assignment in the third example of this invention.
Figure 14B:
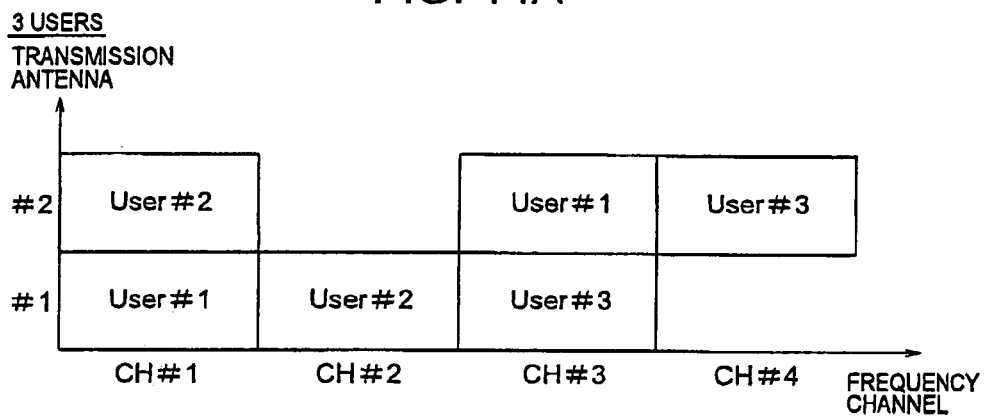
Figure 14C:
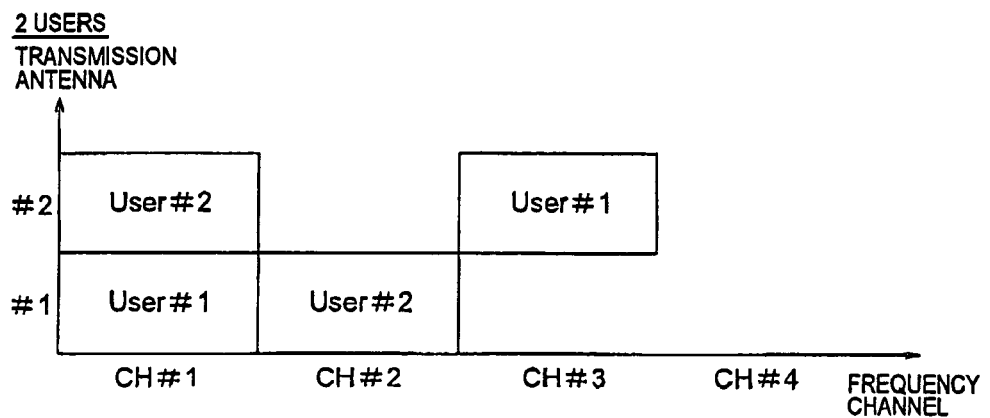

FIGS. 14A to 14C are views for describing resource assignment in the third example of this invention. FIG. 14A shows the case of four users. FIG. 14B shows the case of three users. FIG. 14C shows the case of two users.

In this example, the scheduler 51 adaptively controls the number of transmission sequences depending upon a reception quality at the receiver. For example, consideration will be made about the case where transmission sequences correspond to different users, respectively, and the number of the transmission sequences is equal to four and the number of the frequency channels is equal to 4. Users #1 to #4 perform frequency hopping using hopping patterns {#1, . . . }, {#2, . . . }, {#3, . . . }, {#4, . . . } for the transmission antenna 24 and using hopping patterns {#3, . . . }, {#1, . . . }, {#4, . . . }, {#2, . . . } for the transmission antenna 25. In this event, frequency channel assignment at a time instant #1 is as shown in FIG. 14A.

In this example, if the reception quality such as a bit error rate and a block error rate does not satisfy a required level, resource assignment to the user #4 is cancelled. Therefore, with respect to users #2 and #3, one of the two channels is prevented from interference from the other transmission antenna, as illustrated in FIG. 14B. Thus, characteristics are improved.

Furthermore, it is assumed that resource assignment to the user #3 is cancelled. In this case, with respect to the user #1 also, one of the two channels is prevented from interference from the other transmission antenna, as illustrated in FIG. 14C. Therefore, characteristics are improved. On the contrary, if the reception quality is excessively higher than the required level, the number of users is increased so that high throughput is realized.

Thus, in this example, the number of transmission sequences is adaptively controlled depending upon the reception quality. Therefore, it is possible to improve the characteristics when correlation between propagation paths is high and to realize high throughput when correlation between propagation paths is low.

Example 4

FIGS. 15A and 15B are views for describing resource assignment in a fourth example of this invention. FIG. 15A shows the case of two channels/user/antenna and FIG. 15B shows the case of channel assignment reduction.

A wireless communication apparatus according to the fourth example of this invention has the above-mentioned structure illustrated in FIG. 13 and the scheduler 51 adaptively controls the number of frequency channels assigned to the transmission sequences depending upon a reception quality at a receiver.

For example, consideration will be made about the case where transmission sequences correspond to different users, respectively, and the number of the transmission sequences is equal to four and the number of the frequency channels is equal to eight for each transmission antenna. In this case, two frequency channels are assigned to each user for each transmission antenna as shown in FIG. 15A.

If the reception quality does not satisfy a required level, frequency channel assignment to each of the users #3 and #4 is reduced to one channel for each transmission antenna. Then, with respect to all users, one channel may be prevented from interference from the other transmission antenna as illustrated in FIG. 15B. Thus, characteristics are improved. On the contrary, if the reception quality is excessively higher than the required level, the number of frequency channels is increased. Thus, high throughput is realized.

Figure 16:
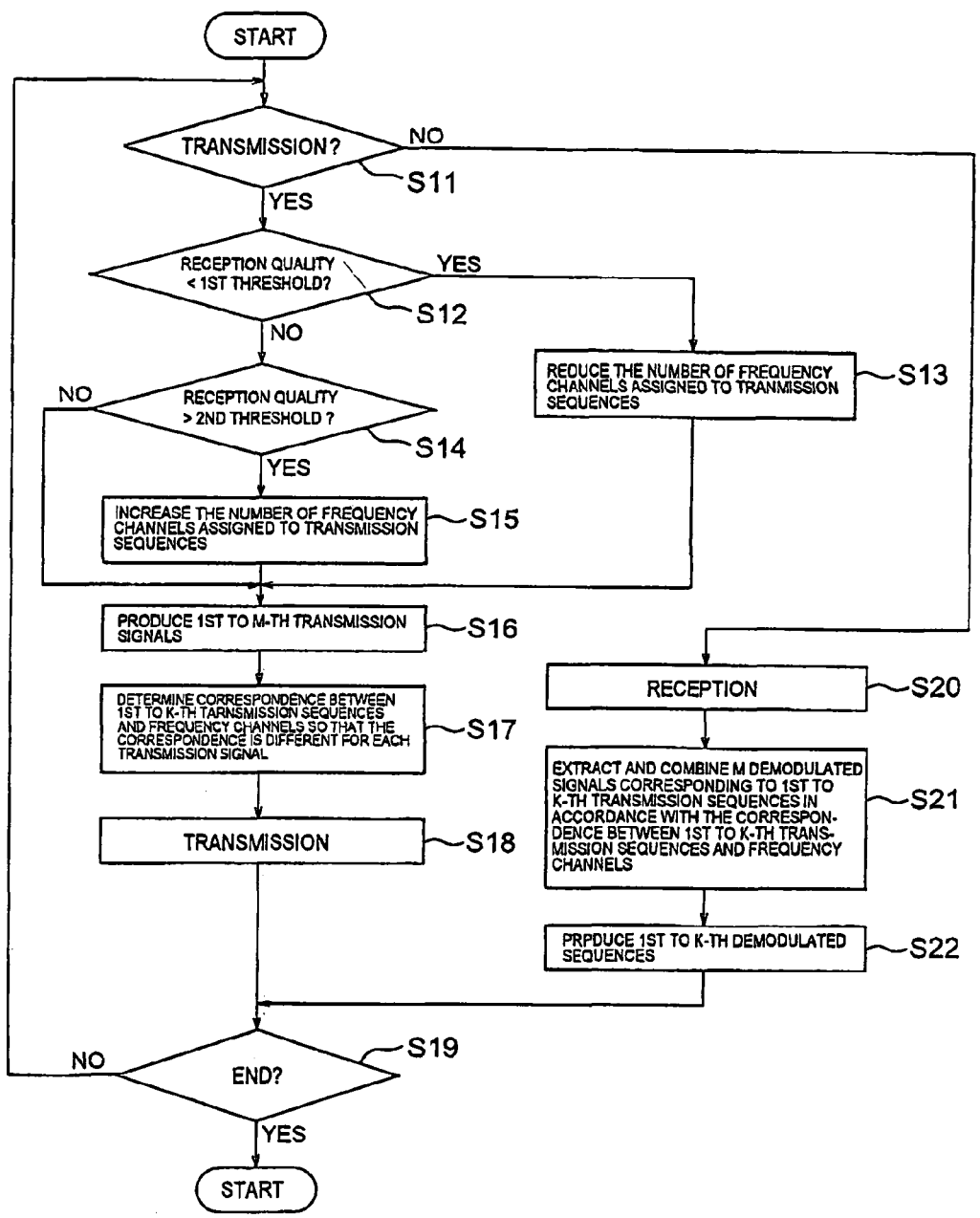
FIG. 16 is a flow chart showing an operation of a wireless communication apparatus according to a fifth example of this invention.

FIG. 16 is a flow chart showing an operation of the wireless communication apparatus according to the fourth example of this invention. Referring to FIG. 16, description will be made of the operation of the wireless communication apparatus according to the fourth example of this invention. A process illustrated in FIG. 16 can be realized by making the transmitting and the receiving portions B and C in the wireless communication apparatus A according to the embodiment of this invention execute the program of the recording medium D.

It is assumed that the wireless communication apparatus performs transmission (step S11 in FIG. 16). In this case, in each transmitter, when the reception quality at the receiving portion is lower than a predetermined first threshold (reception quality<first threshold) (step S12 in FIG. 16), the number of frequency channels to be assigned to the transmission sequence is reduced (step S13 in FIG. 16). If the reception quality at the receiving portion is higher than a predetermined second threshold (reception quality>second threshold) (step S14 in FIG. 16), the number of frequency channels to be assigned to the transmission sequence is increased (step S15 in FIG. 16).

Thereafter, in the wireless communication apparatus, each transmitter produces first through M-th transmission signals (step S16 in FIG. 16), determines correspondence between first through K-th transmission sequences and frequency channels so that the correspondence is different for each transmission signal (step S17 in FIG. 16), and transmits the transmission signals (step S18 in FIG. 16).

On the other hand, in case where reception is carried out (step S11 in FIG. 16), the wireless communication apparatus receives a signal sent thereto (step S20 in FIG. 16). According to the correspondence between the first through the K-th transmission sequences and the frequency channels, M demodulated signals corresponding to the first through the K-th transmission sequences are extracted and combined (step S21 in FIG. 16). With reference to the result thereof, first through K-th demodulated sequences are produced (step S22 in FIG. 16). Until an end (step S19 in FIG. 16), the wireless communication apparatus repeatedly carries out the above-mentioned process.

Thus, in this example, by adaptively controlling the number of frequency channels assigned to the transmission sequences depending upon the reception quality, it is possible to improve characteristics when correlation between propagation paths is high and to realize high throughput when correlation between propagation paths is low.

Example 5

Figure 17A:
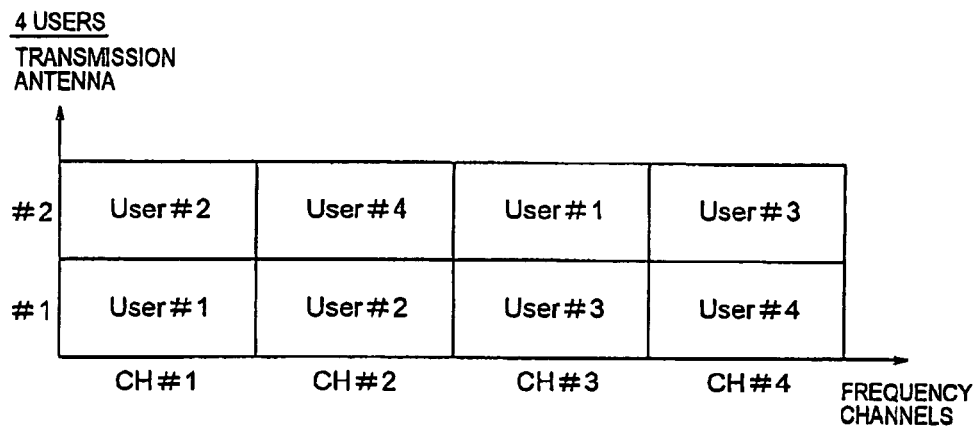
FIGS. 17A and 17B are views for describing resource assignment in the fifth example of this invention.
Figure 17B:
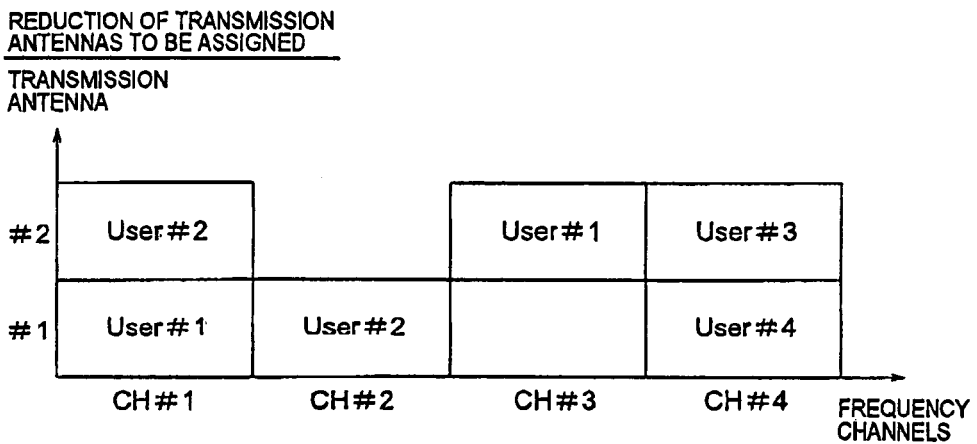

FIGS. 17A and 17B are views for describing resource assignment in a fifth example of this invention. FIG. 17A shows the case of four users. FIG. 17B shows the case of reducing the number of transmission antennas to be assigned.

A wireless communication apparatus according to the fifth example of this invention has the above-mentioned structure illustrated in FIG. 13 and the scheduler 51 adaptively controls the number of transmission antennas assigned to transmission sequences depending upon the reception quality at the receiver.

For example, consideration will be made about the case where transmission sequences correspond to different users, respectively, and the number of the transmission sequences is equal to four and the number of the frequency channels is equal to four for each transmission antenna. In this case, if the reception quality does not satisfy a required level, the number of transmission antennas assigned to each of the users #3 and #4 is reduced to one. Then, with respect to the users #1 and #2, one of the two channels may be prevented from interference from the other transmission antenna, as illustrated in FIG.

17B. Therefore, characteristics are improved. On the contrary, if the reception quality is excessively higher than the required level, the number of transmission antennas to be assigned is increased so that high throughput is realized.

Figure 18:
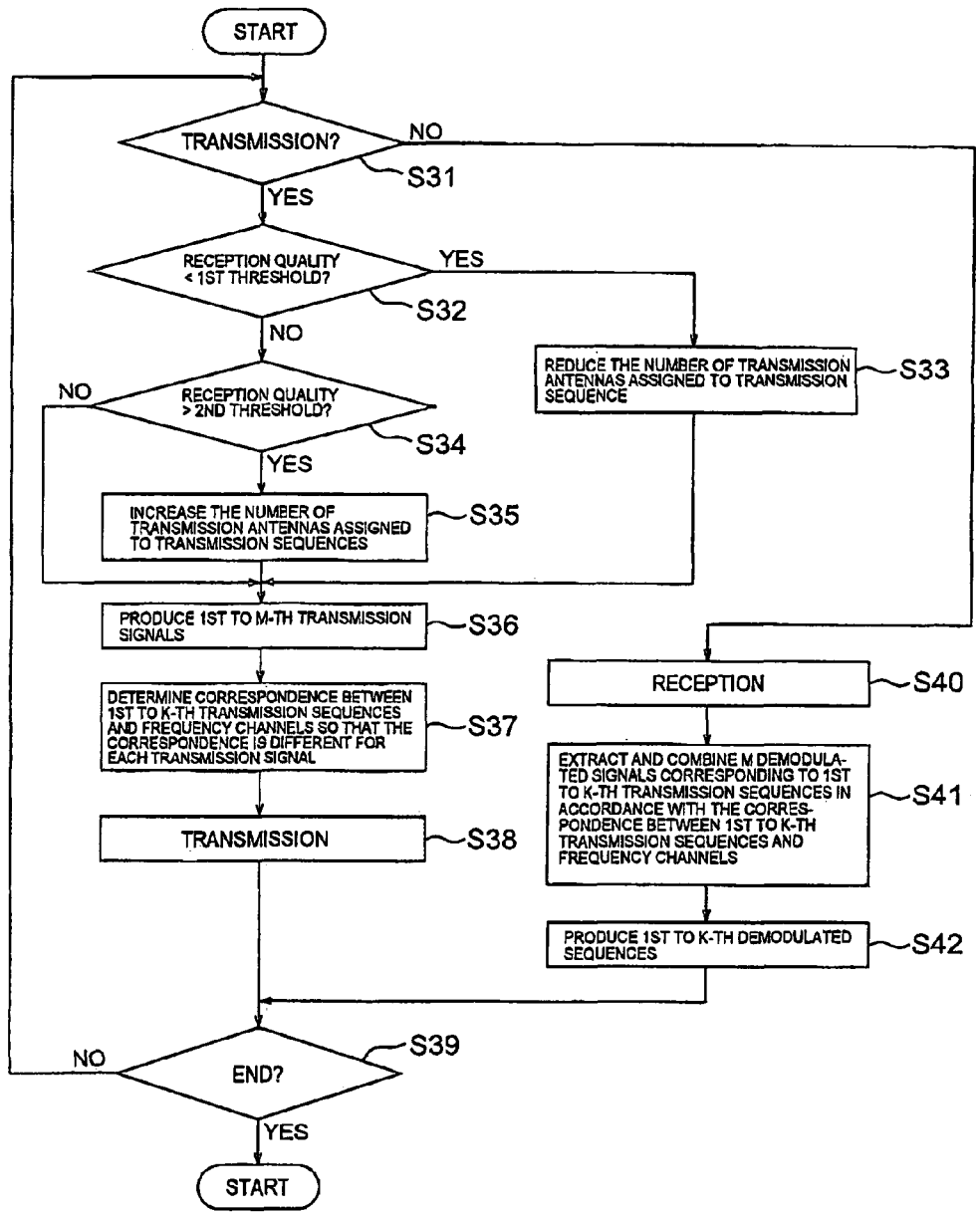
FIG. 18 is a flow chart showing an operation of the wireless communication apparatus according to the fifth example of this invention.

FIG. 18 is a flow chart showing an operation of the wireless communication apparatus according to the fifth example of this invention. Referring to FIG. 18, description will be made about the operation of the wireless communication apparatus according to the fifth example of this invention. A process illustrated in FIG. 18 can be realized by making the transmitting and the receiving portions B and C in the wireless communication apparatus A according to the embodiment of this invention execute the program of the recording medium D.

It is assumed that the wireless communication apparatus performs transmission (step S31 in FIG. 18). In this case, in each transmitter, when the reception quality at the receiving portion is lower than a predetermined first threshold (reception quality<first threshold) (step S32 in FIG. 18), the number of transmission antennas to be assigned to the transmission sequence is reduced (step S33 in FIG. 18). If the reception quality at the receiving portion is higher than a predetermined second threshold (reception quality>second threshold) (step S34 in FIG. 18), the number of transmission antennas assigned to the transmission sequence is increased (step S35 in FIG. 18).

Thereafter, in the wireless communication apparatus, each transmitter produces first through M-th transmission signals (step S36 in FIG. 18), determines correspondence between first through K-th transmission sequences and frequency channels so that the correspondence is different for each transmission signal (step S37 in FIG. 18), and transmits the transmission signals (step S38 in FIG. 18).

On the other hand, in case where reception is carried out (step S31 in FIG. 18), the wireless communication apparatus receives a signal sent thereto (step S40 in FIG. 18). According to the correspondence between the first through the K-th transmission sequences and the frequency channels, M demodulated signals corresponding to each of the first through the K-th transmission sequences are extracted and combined (step S41 in FIG. 18). With reference to the result thereof, first through K-th demodulated sequences are produced (step S42 in FIG. 18). Until an end (step S39 in FIG. 18), the wireless communication apparatus repeatedly carries out the above-mentioned process.

Thus, in this example, by adaptively controlling the number of transmission antennas assigned to the transmission sequences depending upon the reception quality, it is possible to improve characteristics when correlation between propagation paths is high and to realize high throughput when correlation between propagation paths is low.

The invention claimed is:

1. A wireless communication system using a wireless communication apparatus having a plurality of transmission and reception antennas, wherein:
the wireless communication apparatus comprising:
correspondence determining means for determining, upon producing first through M-th (M being an integer not smaller than 2) transmission signals, correspondence between first through K-th (K being an integer not smaller than 2) transmission sequences and frequency channels so that the correspondence is different for each of said plurality of transmission antennas, where each transmission signal output has a different correspondence,
the correspondence determining means comprises:
a transmitting portion including coded sequence producing means for encoding first through K-th transmission sequences to produce first through K-th coded sequences, respectively, interleaved sequence producing means for interleaving the first through the K-th coded sequences to produce first through K-th interleaved sequences, respectively, partial transmission sequence producing means for dividing each of the first through the K-th interleaved sequences into first through M-th partial transmission sequences, transmission signal producing means for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively,
the transmitting portion comprises:
scheduling means for reducing the number of transmission sequences when a reception quality at the receiving portion is lower than a predetermined first threshold and for increasing the number of transmission sequences when the reception quality is higher than a predetermined second threshold; and
extracting and combining means for extracting and combining, upon producing first through K-th demodulated sequences, M demodulated signals corresponding to the first through the K-th transmission sequences in accordance with the correspondence between the first through the K-th transmission sequences and the frequency channels,
the extracting and combining means comprises:
a receiving portion including first through N-th (N being an integer not smaller than 1) reception antennas, demodulating means for decomposing first through N-th reception signals received by the first through the N-th reception antennas into first through M-th partial demodulated signals for each frequency channel, demodulated sequence producing means for extracting and combining, from the first through the M-th partial demodulated signals for each frequency channel, M demodulated signals corresponding to each of the first through the K-th transmission sequences to thereby produce first through K-th demodulated sequences, deinterleaved sequence producing means for deinterleaving the first through the K-th demodulated sequences to produce first through K-th deinterleaved sequences, respectively, and decoding means for decoding the first through the K-th deinterleaved sequences to produce first through K-th decoded sequences, respectively.

2. The wireless communication system according to claim 1, wherein the scheduling means reduces the number of transmission sequences successively from the transmission sequence for which the reception quality at the receiving portion for each transmission sequence is low.

3. The wireless communication system according to claim 1, wherein OFDM (Orthogonal Frequency Division Multiplex) is used as a wireless transmission method and frequency multiplexing is realized by multiplexing subcarriers.

4. The wireless communication system according to claim 1, wherein:
the transmission signal producing means determines, upon producing the first through the M-th transmission signals, correspondence between the first through the K-th transmission sequences and the frequency channels by the use of a different frequency hopping pattern for each of said plurality of transmission antennas, where each transmission signal output has a different frequency hopping pattern;

the demodulated sequence producing means extracting and combining, upon producing the first through the K-th demodulated sequences, M demodulated signals corresponding to each of the first through the K-th transmission sequences in accordance with the different hopping pattern for each transmission signal output.

5. The wireless communication system according to claim 4, wherein a frequency hopping pattern such that frequency channels corresponding to an i-th (i=1, 2, . . . , K) transmission sequence are completely orthogonal among the first through the M-th transmission signals.

6. A wireless communication system using a wireless communication apparatus having a plurality of transmission and reception antennas, wherein:

the wireless communication apparatus comprising:
correspondence determining means for determining, upon producing first through M-th (M being an integer not smaller than 2) transmission signals, correspondence between first through K-th (K being an integer not smaller than 2) transmission sequences and frequency channels so that the correspondence is different for each of said plurality of transmission antennas, where each transmission signal output has a different correspondence, the correspondence determining means comprises:
a transmitting portion including coded sequence producing means for encoding first through K-th transmission sequences to produce first through K-th coded sequences, respectively, interleaved sequence producing means for interleaving the first through the K-th coded sequences to produce first through K-th interleaved sequences, respectively, partial transmission sequence producing means for dividing each of the first through the K-th interleaved sequences into first through M-th partial transmission sequences, transmission signal producing means for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively, the transmitting portion comprises:
scheduling means for reducing the number of frequency channels assigned to the transmission sequences when a reception quality at the receiving portion is lower than a predetermined first threshold and for increasing the number of frequency channels assigned to the transmission sequences when the reception quality is higher than a predetermined second threshold; and extracting and combining means for extracting and combining, upon producing first through K-th demodulated sequences, M demodulated signals corresponding to the first through the K-th transmission sequences in accordance with the correspondence between the first through the K-th transmission sequences and the frequency channels, the extracting and combining means comprises:
a receiving portion including first through N-th (N being an integer not smaller than 1) reception antennas, demodulating means for decomposing first through N-th reception signals received by the first through the N-th reception antennas into first through M-th partial demodulated signals for each frequency channel, demodulated sequence producing means for extracting and combining, from the first through the M-th partial demodulated signals for each frequency channel, M demodulated signals corresponding to each of the first through the K-th transmission sequences to thereby produce first through K-th demodulated sequences, deinterleaved sequence producing means for deinterleaving the first through the K-th demodulated sequences to produce first through K-th deinterleaved sequences, respectively, and decoding means for decoding the first through the K-th deinterleaved sequences to produce first through K-th decoded sequences, respectively.

7. The wireless communication system according to claim 6, wherein OFDM (Orthogonal Frequency Division Multiplex) is used as a wireless transmission method and frequency multiplexing is realized by multiplexing subcarriers.

8. The wireless communication system according to claim 6, wherein:
the transmission signal producing means determines, upon producing the first through the M-th transmission signals, correspondence between the first through the K-th transmission sequences and the frequency channels by the use of a different frequency hopping pattern for each of said plurality of transmission antennas, where each transmission signal output has a different frequency hopping pattern;

the demodulated sequence producing means extracting and combining, upon producing the first through the K-th demodulated sequences, M demodulated signals corresponding to each of the first through the K-th transmission sequences in accordance with the different hopping pattern for each transmission signal output.

9. The wireless communication system according to claim 8, wherein a frequency hopping pattern such that frequency channels corresponding to an i-th (i=1, 2, . . . , K) transmission sequence are completely orthogonal among the first through the M-th transmission signals.

10. A wireless communication system using a wireless communication apparatus having a plurality of transmission and reception antennas, wherein:

the wireless communication apparatus comprising:
correspondence determining means for determining, upon producing first through M-th (M being an integer not smaller than 2) transmission signals, correspondence between first through K-th (K being an integer not smaller than 2) transmission sequences and frequency channels so that the correspondence is different for each of said plurality of transmission antennas, where each transmission signal output has a different correspondence, the correspondence determining means comprises:
a transmitting portion including coded sequence producing means for encoding first through K-th transmission sequences to produce first through K-th coded sequences, respectively, interleaved sequence producing means for interleaving the first through the K-th coded sequences to produce first through K-th interleaved sequences, respectively, partial transmission sequence producing means for dividing each of the first through the K-th interleaved sequences into first through M-th partial transmission sequences, transmission signal producing means for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively, the transmitting portion comprises:

scheduling means for reducing the number of frequency channels assigned to the transmission sequence for which a reception quality at the receiving portion for each transmission sequence is lower than a predetermined first threshold and for increasing the number of frequency channels assigned to the transmission sequence for which the reception quality is higher than a predetermined second threshold; and extracting and combining means for extracting and combining, upon producing first through K-th demodulated sequences, M demodulated signals corresponding to the first through the K-th transmission sequences in accordance with the correspondence between the first through the K-th transmission sequences and the frequency channels, the extracting and combining means comprises:

a receiving portion including first through N-th (N being an integer not smaller than 1) reception antennas, demodulating means for decomposing first through N-th reception signals received by the first through the N-th reception antennas into first through M-th partial demodulated signals for each frequency channel, demodulated sequence producing means for extracting and combining, from the first through the M-th partial demodulated signals for each frequency channel, M demodulated signals corresponding to each of the first through the K-th transmission sequences to thereby produce first through K-th demodulated sequences, deinterleaved sequence producing means for deinterleaving the first through the K-th demodulated sequences to produce first through K-th deinterleaved sequences, respectively, and decoding means for decoding the first through the K-th deinterleaved sequences to produce first through K-th decoded sequences, respectively.

11. The wireless communication system according to claim 10, wherein OFDM (Orthogonal Frequency Division Multiplex) is used as a wireless transmission method and frequency multiplexing is realized by multiplexing subcarriers.

12. The wireless communication system according to claim 10, wherein:

the transmission signal producing means determines, upon producing the first through the M-th transmission signals, correspondence between the first through the K-th transmission sequences and the frequency channels by the use of a different frequency hopping pattern for each of said plurality of transmission antennas, where each transmission signal output has a different frequency hopping pattern;

the demodulated sequence producing means extracting and combining, upon producing the first through the K-th demodulated sequences, M demodulated signals corresponding to each of the first through the K-th transmission sequences in accordance with the different hopping pattern for each transmission signal output.

13. The wireless communication system according to claim 12, wherein a frequency hopping pattern such that frequency channels corresponding to an i-th (i=1, 2, ..., K) transmission sequence are completely orthogonal among the first through the M-th transmission signals.

14. A wireless communication system using a wireless communication apparatus having a plurality of transmission and reception antennas, wherein:

the wireless communication apparatus comprising:

correspondence determining means for determining, upon producing first through M-th (M being an integer not smaller than 2) transmission signals, correspondence between first through K-th (K being an integer not smaller than 2) transmission sequences and frequency channels so that the correspondence is different for each of said plurality of transmission antennas, where each transmission signal output has a different correspondence, the correspondence determining means comprises:

a transmitting portion including coded sequence producing means for encoding first through K-th transmission sequences to produce first through K-th coded sequences, respectively, interleaved sequence producing means for interleaving the first through the K-th coded sequences to produce first through K-th interleaved sequences, respectively, partial transmission sequence producing means for dividing each of the first through the K-th interleaved sequences into first through M-th partial transmission sequences, transmission signal producing means for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively, the transmitting portion comprises:

scheduling means for reducing the number of transmission antennas assigned to the transmission sequences when a reception quality at the receiving portion is lower than a predetermined first threshold and for increasing the number of transmission antennas assigned to transmission sequences when the reception quality is higher than a predetermined second threshold; and extracting and combining means for extracting and combining, upon producing first through K-th demodulated sequences, M demodulated signals corresponding to the first through the K-th transmission sequences in accordance with the correspondence between the first through the K-th transmission sequences and the frequency channels, the extracting and combining means comprises:

a receiving portion including first through N-th (N being an integer not smaller than 1) reception antennas, demodulating means for decomposing first through N-th reception signals received by the first through the N-th reception antennas into first through M-th partial demodulated signals for each frequency channel, demodulated sequence producing means for extracting and combining, from the first through the M-th partial demodulated signals for each frequency channel, M demodulated signals corresponding to each of the first through the K-th transmission sequences to thereby produce first through K-th demodulated sequences, deinterleaved sequence producing means for deinterleaving the first through the K-th demodulated sequences to produce first through K-th deinterleaved sequences, respectively, and decoding means for decoding the first through the K-th deinterleaved sequences to produce first through K-th decoded sequences, respectively.

15. The wireless communication system according to claim 14, wherein OFDM (Orthogonal Frequency Division Multiplex) is used as a wireless transmission method and frequency multiplexing is realized by multiplexing subcarriers.

16. The wireless communication system according to claim 14, wherein:
the transmission signal producing means determines, upon producing the first through the M-th transmission signals, correspondence between the first through the K-th transmission sequences and the frequency channels by the use of a different frequency hopping pattern for each of said plurality of transmission antennas, where each transmission signal output has a different frequency hopping pattern;
the demodulated sequence producing means extracting and combining, upon producing the first through the K-th demodulated sequences, M demodulated signals corresponding to each of the first through the K-th transmission sequences in accordance with the different hopping pattern for each transmission signal output.

17. The wireless communication system according to claim 16, wherein a frequency hopping pattern such that frequency channels corresponding to an i-th (i=1, 2, . . . , K) transmission sequence are completely orthogonal among the first through the M-th transmission signals.

18. A wireless communication system using a wireless communication apparatus having a plurality of transmission and reception antennas, wherein:
the wireless communication apparatus comprising:
correspondence determining means for determining upon producing first through M-th (M being an integer not smaller than 2) transmission signals, correspondence between first through K-th (K being an integer not smaller than 2) transmission sequences and frequency channels so that the correspondence is different for each of said plurality of transmission antennas, where each transmission signal output has a different correspondence,
the correspondence determining means comprises:
a transmitting portion including coded sequence producing means for encoding first through K-th transmission sequences to produce first through K-th coded sequences, respectively, interleaved sequence producing means for interleaving the first through the K-th coded sequences to produce first through K-th interleaved sequences, respectively, partial transmission sequence producing means for dividing each of the first through the K-th interleaved sequences into first through M-th partial transmission sequences, transmission signal producing means for frequency-multiplexing the first through the M-th partial transmission sequences corresponding to each of the first through the K-th transmission sequences with respect to each of the first through the M-th partial transmission sequences to produce first through M-th transmission signals, and first through M-th transmission antennas for transmitting the first through the M-th transmission signals, respectively,
the transmitting portion comprises:
scheduling means for reducing the number of transmission antennas assigned to the transmission sequence for which a reception quality at the receiving portion for each transmission sequence is lower than a predetermined first threshold and for increasing the number of transmission antennas assigned to the transmission sequence for which the reception quality is higher than a predetermined second threshold; and
extracting and combining means for extracting and combining, upon producing first through K-th demodulated sequences, M demodulated signals corresponding to the first through the K-th transmission sequences in accordance with the correspondence between the first through the K-th transmission sequences and the frequency channels,
the extracting and combining means comprises:
a receiving portion including first through N-th (N being an integer not smaller than 1) reception antennas, demodulating means for decomposing first through N-th reception signals received by the first through the N-th reception antennas into first through M-th partial demodulated signals for each frequency channel, demodulated sequence producing means for extracting and combining, from the first through the M-th partial demodulated signals for each frequency channel, M demodulated signals corresponding to each of the first through the K-th transmission sequences to thereby produce first through K-th demodulated sequences, deinterleaved sequence producing means for deinterleaving the first through the K-th demodulated sequences to produce first through K-th deinterleaved sequences, respectively, and decoding means for decoding the first through the K-th deinterleaved sequences to produce first through K-th decoded sequences, respectively.

19. The wireless communication system according to claim 18, wherein OFDM (Orthogonal Frequency Division Multiplex) is used as a wireless transmission method and frequency multiplexing is realized by multiplexing subcarriers.

20. The wireless communication system according to claim 18, wherein:
the transmission signal producing means determines, upon producing the first through the M-th transmission signals, correspondence between the first through the K-th transmission sequences and the frequency channels by the use of a different frequency hopping pattern for each of said plurality of transmission antennas, where each transmission signal output has a different frequency hopping pattern;
the demodulated sequence producing means extracting and combining, upon producing the first through the K-th demodulated sequences, M demodulated signals corresponding to each of the first through the K-th transmission sequences in accordance with the different hopping pattern for each transmission signal output.

21. The wireless communication system according to claim 20, wherein a frequency hopping pattern such that frequency channels corresponding to an i-th (i=1, 2, . . . , K) transmission sequence are completely orthogonal among the first through the M-th transmission signals.

* * * * *